(12) United States Patent
Fitzgerald

(10) Patent No.: US 7,258,086 B2
(45) Date of Patent: Aug. 21, 2007

(54) FOUR-CYLINDER, FOUR-CYCLE, FREE PISTON, PREMIXED CHARGE COMPRESSION IGNITION, INTERNAL COMBUSTION RECIPROCATING PISTON ENGINE WITH A VARIABLE PISTON STROKE

(76) Inventor: John William Fitzgerald, 2827 River Trace Cir., Bradenton, FL (US) 34208

( * ) Notice: Subject to any disclaimer, the term of this patent is extended or adjusted under 35 U.S.C. 154(b) by 0 days.

(21) Appl. No.: 11/358,789

(22) Filed: Feb. 21, 2006

(65) Prior Publication Data

US 2006/0185631 A1 Aug. 24, 2006

Related U.S. Application Data

(60) Provisional application No. 60/656,458, filed on Feb. 24, 2005.

(51) Int. Cl.
*F02B 71/00* (2006.01)
*F02B 75/24* (2006.01)
*F01L 9/02* (2006.01)

(52) U.S. Cl. ............... 123/46 R; 123/53.1; 123/90.15; 60/517

(58) Field of Classification Search ............... 123/53.1, 123/90.14, 48 R, 48 B, 78 R, 78 E, 78 F, 123/46 R, 46 A, 46 B; 251/63.5
See application file for complete search history.

(56) References Cited

U.S. PATENT DOCUMENTS

| | | | |
|---|---|---|---|
| 6,029,616 A * | 2/2000 | Mayne et al. ............. 123/46 R |
| 6,178,939 B1 * | 1/2001 | Powell .................. 123/184.21 |
| 6,282,895 B1 * | 9/2001 | Johansson et al. ............ 60/524 |
| 6,652,247 B2 * | 11/2003 | Gray, Jr. ..................... 417/364 |
| 7,021,433 B2 * | 4/2006 | Yamada et al. ............. 188/294 |
| 7,077,080 B2 * | 7/2006 | Schmuecker et al. ..... 123/46 R |
| 2003/0005695 A1 * | 1/2003 | Allen et al. .................... 60/608 |
| 2003/0044293 A1 * | 3/2003 | Gray, Jr. ..................... 417/364 |
| 2003/0124003 A1 * | 7/2003 | Gray, Jr. ..................... 417/364 |
| 2004/0112048 A1 * | 6/2004 | Chien et al. .................. 60/517 |
| 2006/0048728 A1 * | 3/2006 | Scalzo ....................... 123/53.1 |
| 2006/0196455 A1 * | 9/2006 | Jones et al. ............. 123/46 SC |

* cited by examiner

*Primary Examiner*—Noah P. Kamen

(57) ABSTRACT

A four-cycle, four-cylinder, premixed charge compression ignition internal combustion reciprocating free piston engine with a variable piston stroke and a compression ratio that varies as needed to provide charge ignition, to offer the potential of higher efficiency, lower emissions, and multi-fuel operation. The engine does not have a crankshaft, and therefore does not provide direct rotary output. Instead its free pistons oscillate, in a manner similar to a two cycle free piston engine. For many applications, such as piston pumps and compressors, the engine provides an output directly driven by the oscillating pistons. In other applications, such as but not limited to use as a gas generator for a power turbine, the engine provides an indirect means of producing rotary power. When the engine is used with high-speed power turbines, the power turbine may be directly coupled to a high-speed alternator for electrical power output.

8 Claims, 20 Drawing Sheets

CROSS SECTION A-A OF FIG. 1B

CROSS SECTION A-A OF FIG. 1B

CROSS SECTION B-B OF FIG. 1C

CROSS SECTION C-C OF FIG. 1A

CROSS SECTION E-E OF FIG. 1A

CROSS SECTION F-F OF FIG. 1B

CROSS SECTION D-D OF FIG. 1A

SECTION A - A
OF FIG. 10C

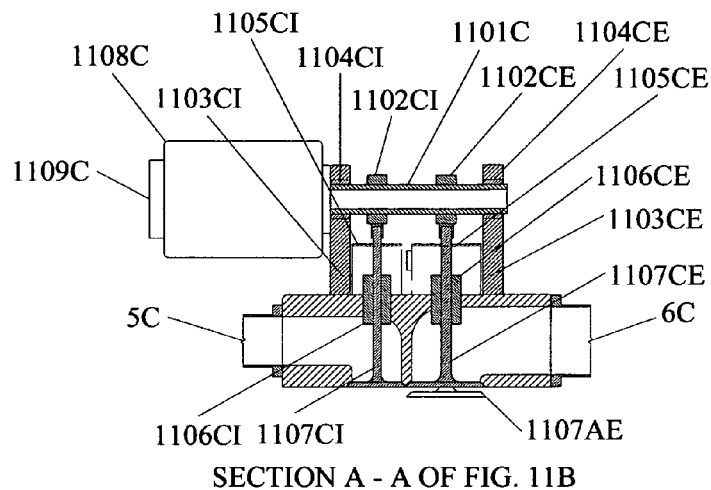
FIG. 11A
SECTION A - A OF FIG. 11B
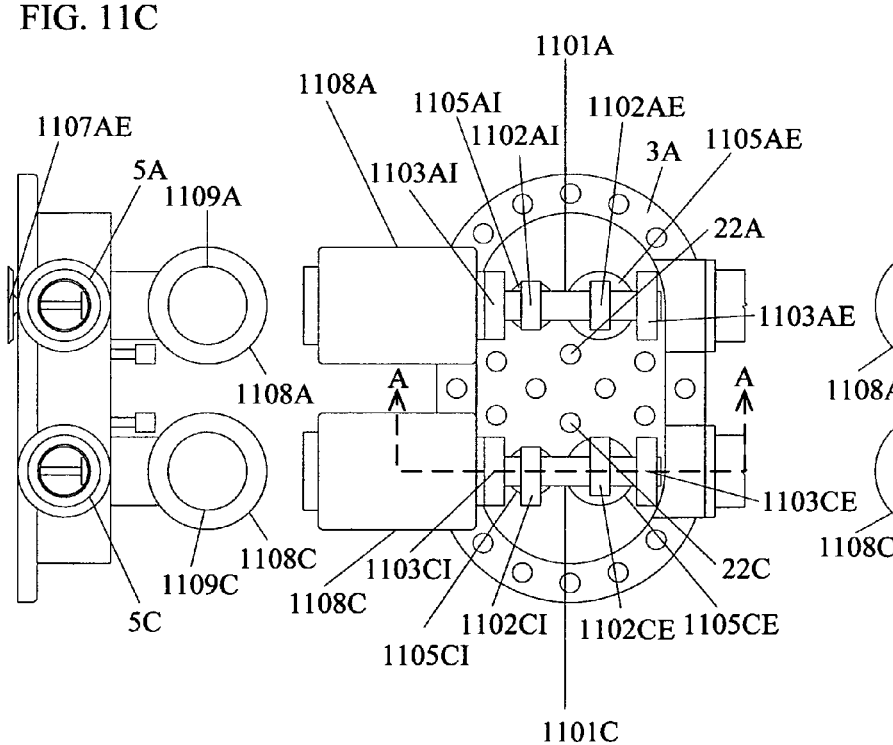
FIG. 11C
FIG. 11B
FIG. 11D

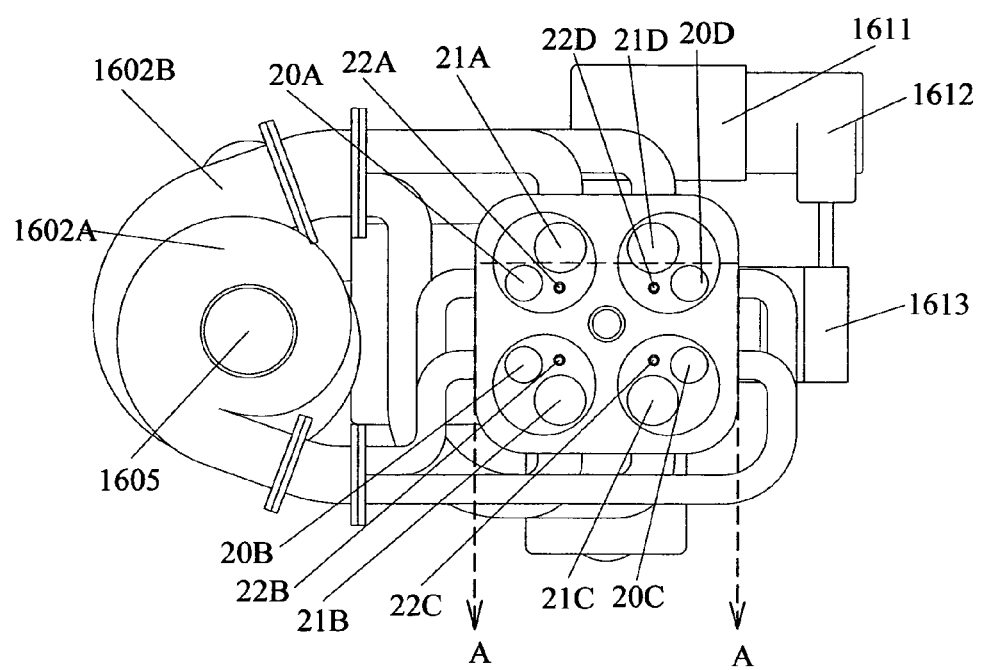
FIG. 18A
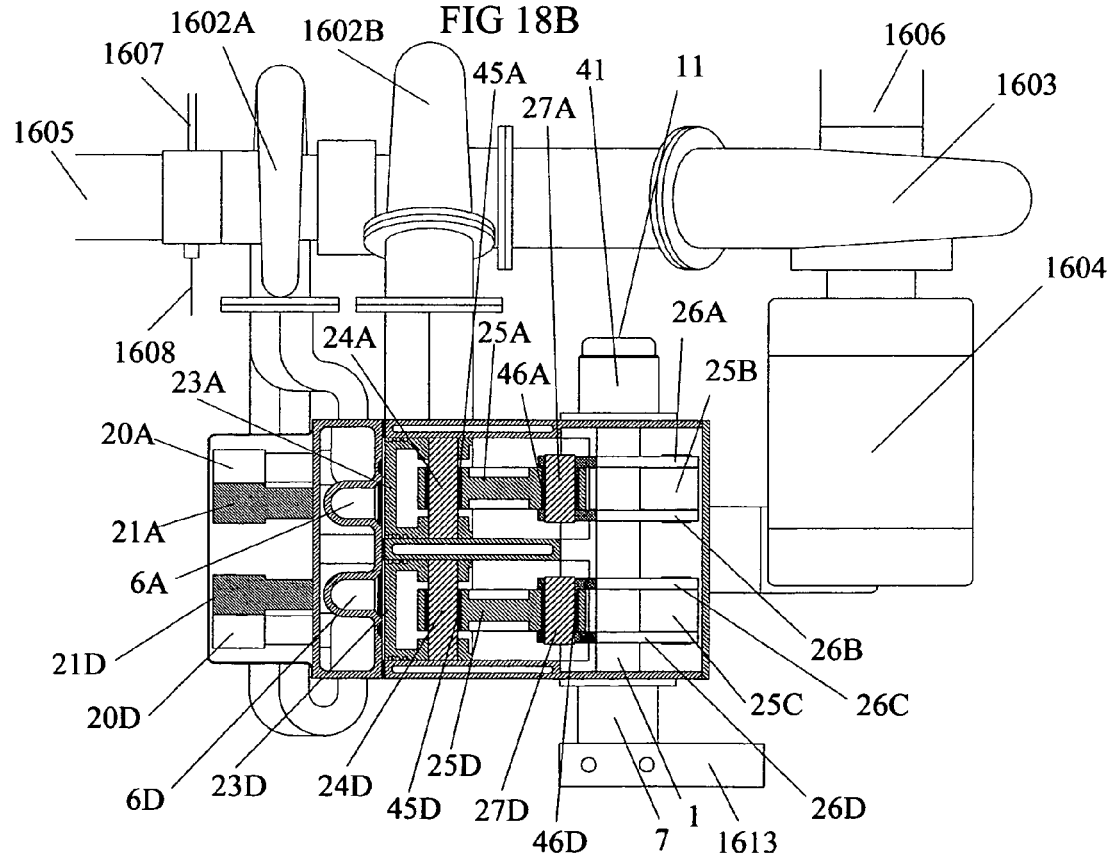
SECTION A-A OF FIG. 18A

SECTION B - B OF FIG. 19B

FOUR-CYLINDER, FOUR-CYCLE, FREE PISTON, PREMIXED CHARGE COMPRESSION IGNITION, INTERNAL COMBUSTION RECIPROCATING PISTON ENGINE WITH A VARIABLE PISTON STROKE

CROSS-REFERENCE TO RELATED APPLICATIONS

The benefit of Provisional Application 60/656,458, filed Feb. 24, 2005 by the same named inventor, entitled "Four cycle, premixed charge compression ignition, free-piston, internal combustion reciprocating engine with a floating (variable) stroke" and of substantially the same subject matter, is hereby requested.

FEDERALLY SPONSORED RESEARCH OR DEVELOPMENT

Not Applicable

COMPACT DISC APPENDIX

Not Applicable

BACKGROUND OF THE INVENTION

This invention relates to the field of engines, specifically to a four-cycle, four cylinder, free-piston, premixed charge compression ignition, internal combustion reciprocating piston engine with a variable piston stroke that offers the potential of enhanced efficiency, lower emissions, and multi-fuel operation. Applications include but are not limited to, use with automotive vehicles, engine driven pumps, engine driven compressors, small aircraft, marine vehicles, and power tools.

Development of the Premixed Charge Compression Ignition (PCCI) engine, and related Homogeneous Charge Compression Ignition (HCCI) internal combustion reciprocating engine has been ongoing for a number of years at Companies, Universities and U.S. National Laboratories—as well as numerous foreign institutions. Among these are:

Companies:
Caterpillar Inc.
Cummins Inc.
General Motors Corporation
Waukesha Engine Universities:
Helsinki University of Technology, Helsinki Finland
Hokkaido University, Sapporo Japan
Lund Institute of Technology, Lund Sweden
Massachusetts Institute of Technology, Boston Mass.
Norwegian University of Science and Technology, Trondheim Norway
University of California, Berkley Calif.
University of Michigan, Ann Arbor Mich.
University of Minnesota, Minneapolis Minn.
University of Wisconsin, Madison Wis.

Laboratories:
Argonne National Laboratory
Lawrence Livermore National Laboratory
National Energy Technology Laboratory
Oak Ridge National Laboratory
Sandia National Laboratory The PCCI/HCCI engine offers the potential of higher efficiency, lower emissions and multi-fuel operation. The technology is scalable from watts to megawatts. Development has progressed on both two and four-cycle versions of PCCI/HCCI engines. Notable work in this field includes that of: Cummins Inc. on four-cycle PCCI engines, resulting in U.S. patent application 2004/00103860; Van Blarigan at Sandia National Laboratories, on the two-cycle, free piston, HCCI "Thermodynamic Fuel Cell" with U.S. Pat. No. 6,199,519 B1; and Caterpillar Inc. with a two-cycle free piston engine with hydraulic output as disclosed in U.S. Pat. No. 6,463,895 B2. However, these efforts have not yet produced a truly viable PCCI/HCCI engine. In four-cycle PCCI/HCCI engines, derived from conventional engines, e.g. Cummins, the fixed stroke of the pistons results in a fixed compression ratio that is a constraint on charge ignition. Thus, this PCCI/HCCI four-cycle engine work, to-date, is based primarily on modification of existing four-cycle engines, with emphasis on control of the charge parameters. These modifications have focused on the very complex control of the individual cylinder charge composition and temperature required to properly time the charge ignition, so as to attain acceptable combustion uniformity between cylinders. The resulting four-cycle engines are highly complex and are very sensitive to ambient conditions and fuel properties. Sensitivity is such that the previously mentioned Cummins published U.S. patent application focuses on the use of duel fuels to modify the auto-ignition properties of the charge. Despite these current difficulties, a study by TIAX, a product and technology development firm, and Global Insight, an industry forecasting firm, titled "The Future of Heavy-Duty Powertrains", predicts "HCCI engines will power nearly 40% of heavy-duty vehicles by 2020.—Initially HCCI will only be able to power light loads at low speeds so early versions of the engine will also incorporate conventional diesel combustion to supply more power when greater demand is placed on the engine." The study also predicts "—a full mode HCCI engine will eventually supersede the initial mixed mode HCCI/diesel technology."

To avoid the complexities of modified conventional engines noted in the foregoing, researchers have investigated other engine configurations for PCCI/HCCI. Free piston engines inherently have a variable stroke and thus avoid the constraint encountered in conventional crankshaft engines. Considerable work has been done, over many decades, in an attempt to develop a practical free piston engine. However, success to date has been limited. Most of this prior effort focused on the two-cycle Diesel variant, with less work on spark ignited engines. The recent work by INNAS Free Piston B.V. to produce a free piston single cylinder engine with hydraulic power output is an example of efforts to produce a practical two-cycle Diesel, free piston engine, see U.S. Pat. No. 6,279,517 B1. Also, Sunpower, Inc., as disclosed in U.S. Pat. Nos. 5,775,273 and 6,035,637, proposes a spark ignited free piston engine design with variable valve actuation and in which the expansion stroke is greater than the compression stroke (for increased efficiency). Pembek Systems Pty Ltd., Australia, advocates "The Free Piston Power Pack" for hybrid electric vehicles utilizes multiple units of two opposed linear piston, two-cycle, free piston engines (Diesel or spark ignited) that have integral linear generators and are self scavenging, see U.S. Pat. No. 6,651,599 B2. However, to date, none of the foregoing has demonstrated a substantive improvement in two-cycle free piston engine performance that would provide a PCCI/HCCI modification to that technology offering improvement over the PCCI/HCCI modified conventional engine. Recent analytical efforts, such as that of Van Blarigan at Sandia, have utilized the PCCI/HCCI cycle in a free piston engine and confirm that conclusion. The two-cycle PCCI/HCCI engine under development at Sandia is more limited in speed range and throttling, produces higher emissions, has lower energy density (primarily due to the linear alternator) and greater fuel consumption (primarily due to charge scavenging limitations inherent in two-cycle engines) compared to a like four-cycle PCCI/HCCI engine. Lotus Engineering Ltd. in conjunction with the University of Sheffield and the University of Loughborough in the U.K. are researching a two cylinder four-cycle free piston linear engine with a integral linear alternator (similar in geometry to the Sandia two-cycle unit) in which the alternator output would be stored as electrical energy (in an external storage device) during the power/exhaust strokes and then used to run the alternator as a motor to drive the piston(s) during the intake/compression and exhaust strokes. (See presentation, "Four Stroke Free Piston Energy Converter" made at the Fuel Cell and Battery Vehicle Industry Academic Network (FABIAN), April 2005 MIRA conference at the University of Sheffield, U.K. available at http://www.shef.ac.uk/fabian/stewart_ws5.ppt) Their preliminary work indicates that this engine offers many improvements over the two-cycle free piston engine, including the use of PCCI/HCCI combustion. However, the proposed engine is complex, requiring a linear alternator/motor with sophisticated and costly energy conversion circuitry and external energy storage. Further, the energy density of the engine and combined supporting devices will be low.

Of further noteworthiness is the recent effort by Kvaerner ASA to develop a Diesel two-cycle free piston gas generator with a power turbine output. (See "Dynamics and Control of a Free piston Diesel Engine" by Johansen et all, Norwegian University of Science and Technology, Department of Engineering Cybernetics, Trondheim, Norway and Kvaerner ASA Technology Development, Lysaker, Norway available at http://citeseer.csail.mit.edu/601185.html.) This effort utilizes technology originally by Pescara and disclosed in U.S. Pat. Nos. 1,657,641, 2,162,967 and 2,581,600, in 1925, 1935 and 1941 respectively, and then furthered by GM, Ford, Junkers and others from the 1930's through the 1960's. It is also related to the subject matter disclosed in U.S. Pat. No. 4,873,822 to Benaroya (1989), entitled "Energy Producing Installation with Internal Combustion Engine and Turbine". The objective of the Kvaerner effort is to produce an engine with a rating of 8 MW having the low weight and compactness of the gas turbine and the low fuel consumption (50% efficiency) of the Diesel engine for Marine propulsion applications. Initial results from a single cylinder test bed engine are promising.

The complexities and limitations of the previously cited engines can be overcome by a four cylinder, four-cycle, free piston, PCCI/HCCI engine disclosed herein, which provides a four cylinder, four-cycle, Free Piston Floating Stroke (FPFS), PCCI/HCCI internal combustion, reciprocating piston engine. Hereinafter, the present invention will be identified by one or more of the following terms, the FPFS engine, the present invention, and the present FPFS engine.

The FPFS engine disclosed herein also includes a gas generator/power turbine configuration, as shown in FIGS. 16-22,—which would retain the advantages of the foregoing mentioned Kvaerner power turbine two-cycle free piston engine but have the lower emissions and lower fuel consumption of a four-cycle PCCI/HCCI engine.

The free piston engine, while solving the charge combustion timing problem associated with crankshaft PCCI/HCCI engines, does not provide a means of directly producing rotary power output. The FPFS engine disclosed herein addresses the foregoing issue by employing a variety of mechanisms to directly utilize the linear motion of the free piston engine or to indirectly convert it to rotary motion.

A four-cycle configuration of a FPFS PCCI/HCCI engine benefits greatly from variable valve actuation (VVA)—to the degree that VVA becomes a practical necessity. Several variable valve geometries are currently under development by others, notable among these are: Sturman Industries, Inc., U.S. Pat. No. 6,820,856 to Grill (2004); Massachusetts Institute of Technology Laboratory for Electronics and Electromagnetic Systems electromagnetic valve drive system, (see the MIT article "Design and Experimental Evaluation of An Electromechanical Engine Valve Drive" published for the 2004 35$^{th}$ Annual IEEE Power Electronics Specialists Conference and available at:

http://www.mit.edu/~djperrea/Publications/Conference%20Papers/cpPESC04p4838.pdf); and Johnson Controls (see presentation "Electromechanical Valve Actuation" at the MIRA conference at the University of Sheffield, Sheffield England Oct. 13, 2004 available at: http://www-.shef.ac.uk/fabian/mareky_ws4pdf.pdf.) Nonetheless, disclosed herein is a VVA mechanism, as shown in FIGS. 11A, B, C, & D, that offers similar performance to those being developed by the foregoing, with the prospect of a lower cost of implementation than from those sources.

There are numerous efforts to improve existing engine technology to lower emissions and improve efficiency e.g. ARES, ARICE, Freedom Car, Advanced Heavy Hybrid, 21$^{st}$ Century Truck Program, etc. Further, there are long term efforts to increase Diesel engine efficiency by Increasing peak pressure. In a study by TEKES ProMOTOR, at the Helsinki University of Finland, extreme engine operating parameters were investigated, including very high operating pressures. (See "Extreme values of the piston engine—Final Report", Sep. 30, 2003 by TEKES ProMOTOR, Academy of Finland, TUKEVA, available at http://www.icel.tkk.fi/eve/ICEL_Final_report.pdf.) It is well understood that the efficiency of gas power cycles in engines is primarily related to the engine mean effective pressure (higher pressure yields higher efficiency), which in turn is limited by engine component design and the materials then available, key among them being the crankshaft. They cite in the foregoing study, as one of the limiting factors to further engine development at these extreme conditions, the inability of the crankshaft to carry the increased loads from such high pressure operation. The crankshaft size required by such loads increases significantly, and the crankshaft size ultimately remains a limiting factor to further increasing engine operating pressure. By using an engine design, such as that being developed by Kaeverner, or as disclosed herein, which utilizes an indirect power extraction method such as the power turbine, the limitations of the crankshaft are circumvented. Note: In the design herein disclosed, as shown in FIGS. 16-22, the piston connecting elements, 1, 24, 25, 26, 45 & 46, do not carry the output load, but instead carry the much lower load required by the pressure of the cylinder then in the compression stroke (and pumping load of the exhaust stroke). This represents a significant advantage toward improving engine efficiency as higher operating pressures may be more readily attainable.

SUMMARY OF THE INVENTION

The general objective of the invention is to provide in a four-cycle engine the variable or "floating" stroke capability (and hence, a variable compression ratio) of the two-cycle, linear, free piston, premixed charge compression ignition, (PCCI/HCCI) engine. As previously noted, with two-cycle linear free piston PCCI/HCCI engines there are inherent constraints on the operating speed range and throttle turn down is limited. When a floating stroke is used in a four-cycle engine, these constraints are reduced and lower emissions are produced (vs. a two-cycle engine). However, the four-cycle PCCI engine, as developed to date, requires highly complex controls that are dictated by the fixed compression ratio associated with the typical crankshaft configuration used in these engines. The present FPFS engine discloses mechanisms, as shown in FIGS. 2, 3, 4, 6, 7, 8, 9, 10, 18 & 19, to replace the conventional rotary crankshaft commonly used in four-cycle PCCI engines with other means of connecting the pistons in a manner so as to attain a floating stroke.

Thus, the beneficial characteristics of both fixed stroke four-cycle PCCI engines and the linear free piston PCCI engines are combined in the FPFS engine disclosed herein. These characteristics include:

Higher operating efficiency
Low emissions
Inherently multi fuel capable
High power density
A wide range of engine size
Good throttle turn down
Cost competitiveness The variable stroke characteristic of the present FPFS engine is best implemented with variable valve actuation (VVA), since the indeterminate stroke length of the present FPFS engine makes it difficult to use the fixed valve timing typically found in conventional engines. Electro-hydraulically operated valves are the preferred means to achieve VVA because each valve has an independent actuator. However, this invention discloses an alternative means of VVA, as shown in FIGS. 11A, B, C & D, which utilizes a motor driven camshaft for each cylinder.

An important element of the present FPFS engine operation is the proper timing of the exhaust valve opening. If an exhaust valve were to open prior to the expansion cycle in the cylinder sufficiently driving the compression cycle in another cylinder to the ignition point of the charge, then the continuous operation of the engine would fail. To aid in achieving the desired valve timing, this invention discloses, as shown in FIG. 2, the use of an ignition detection sensor, 22A, B, C & D, in each cylinder. Preferably, a piezoelectric pressure transducer, ion sensor, fast thermocouple or fast UV flame sensor. The ignition sensor, as shown FIG. 12, signals the engine control when the ignition occurs. The timing of that signal, in conjunction with data from conventional engine sensors, is used by a control algorithm to open the exhaust valve(s) in the cylinder(s). Further, this invention discloses the concept of an adaptive control, as shown in FIG. 13, which utilizes the ignition sensor, 22A, B, C & D, information (and conventional sensor data—such as piston position, 11) to determine the actual compression ratio at the point of charge ignition. This information is used by the control to modify valve operating parameters (opening timing, time open, open height, etc) to constantly attain peak engine performance. It is anticipated that to optimally use this adaptive control the characteristics of the fuel(s) being used will need to be placed into the control memory and that a microprocessor based control is preferable (which is common on existing engines).

The present FPFS four-cycle engine is effectively limited to four-cylinders due to the constraints imposed by the variable length of the stroke and the requirement of one expansion cycle to drive the next compression cycle. For example, in an eight cylinder version of an FPFS engine, two cylinders would be in the compression stroke concurrently. It is unlikely both would achieve auto-ignition simultaneously, thus one would misfire and significantly reduce output, increasing fuel consumption and emissions. Cylinder arrangement of the present FPFS engine may be the common in-line, flat, V, etc. (not shown) arrangements used on conventional engines but due to the greater flexibility of a free piston linear oscillation or pivoting shaft motion, versus a rotating crankshaft, other less common configurations, such as the quad cylinder arrangement presented in the drawings herein, as shown in FIGS. 16-20, can also be used. Note: The output of multiple four-cylinder engines, such as from hydraulic pumps or electric generators, can be connected together to provide higher capacity output, as opposed to that achievable via a single larger four-cycle engine. The advantage of this multiple engine configuration is in the ability to throttle the engine group by turning off one or more engines in the group at lower loads, which provides an improved efficiency over throttling a single larger engine. Also, in a multiple engine group, the cumulative operating time, and/or power produced from each engine, can be tracked and each engine in the group cycled for a length of time to equalize either the operating hours or the total kW produced by each engine so as to evenly distribute wear. Further, engines in the multiple engine group that have developed problems, but are still serviceable, could be individually limited in power production.

A conventional crankshaft type of construction, with an over-length throw connecting rod, could be made to function in the free piston floating stroke four-cycle engine, but it Is not required and is a sub-optimal solution.

The preferred floating stroke mechanism, for direct extraction of power from the FPFS engine, is either a linear oscillating shaft, as shown in FIGS. 10A & 10B, or a pivoting shaft with rocker arms, as shown in FIGS. 1-8, for attaching the piston connecting rods. In the former configuration of the FPFS the concurrent linear motion of two oscillating piston pairs can be used to directly drive a variable displacement piston pump or compressor or linear alternator. Or, in the latter, linear oscillation of the piston pairs can be converted to a pivoting (or rocking) shaft output. This pivot shaft does not rotate but instead oscillates clockwise then counterclockwise making a partial rotation with each engine cycle. A pivoting shaft with two sets of rocker arms is used to join two piston pairs with each other, such that the motion of one piston pair is opposite that of the other piston pair (as opposed to the piston pairs moving concurrently in the former arrangement). The length of rocker arms from the pivot shaft is made sufficiently long such that the stroke of the pistons is not limited by the rocker arm throw. Note: In the four-cylinder FPFS engine (as in conventional four-cylinder engines), each of the compression, expansion, exhaust and intake cycles are present at any given time, in one cylinder or the other. The expansion cycle of one cylinder drives the compression cycle of another. Thus, the length of piston travel is always constrained by the pressure of a compression cycle. The stroke length of the other pistons, for example in the exhaust cycle, is determined by the ignition event in the cylinder then in a compression stroke. The compression ignition is a function of a series of engine and charge parameters, which will vary to some extent from cycle to cycle. Thus, the stroke length of any given cycle is indeterminate until charge ignition occurs. Each piston compression stroke length is independent of the other and the piston motion is almost completely free of mechanical stroke length limitations. The mechanisms disclosed by this invention allow the stroke length to vary, or "float", according to the compression ratio required to ignite the charge of each compression cycle, fully independent of any other cylinders compression stroke. The pistons, if not constrained by the charge pressure of a compression cycle (normally followed by charge ignition), would ultimately stop against the cylinder head.

As has already been demonstrated by existing free piston PCCI engines, very high compression ratios can also be attained, which improves engine efficiency and can accommodate the characteristics of many different fuels. Very lean fuel mixtures may be utilized, resulting in low emissions. This is also the case with the present FPFS engine. True premixed charge compression ignition, similar to that attained by linear piston engines, or in laboratory tests using a rapid compression-expansion machine, can be attained in the present FPFS engine. In many applications an oscillating shaft can be effectively used to extract power from the engine, as disclosed herein. We note however that, the requirements of some applications are better met by using rotary motion. The preferred means for obtaining rotary motion from the present FPFS engine is to use it as a gas generator for a power turbine. Free piston engines, of both the Otto and Diesel cycles, that use a turbine to extract energy from the engine, have been previously produced, as noted in the Background of the Invention section herein. However, the present FPFS PCCI/HCCI engine with power turbine energy extraction is unique. Both means of power extraction, directly from the oscillating shaft and/or pivoting shaft, as shown in FIGS. 14 & 15, as well as from a power turbine, as shown in FIGS. 16-20, are disclosed herein as a part of the present FPFS invention.

As has been done on conventional engines for some time, both turbocharging and supercharging may be effectively applied to the FPFS engine, as shown in FIGS. 16-19. Either one may be with or without intercooling, as shown in FIGS. 20-22.

As has been done on conventional engines for some time, waste heat from the FPFS engine can be recovered in a variety of ways. This recovered energy can be used directly in the form of thermal energy or converted by a secondary process to another form. The most common of these alternate energy forms is electricity. Typically, electrical energy produced from waste engine heat employs a combined cycle, generally a Rankine or organic Rankine cycle (ORC) driving a generator. Other methods, including thermo-electric are possible. Both are possible with the present FPFS engine. A unique form of ORC using Siloxane fluids would provide a good match with the temperature output characteristics of the power turbine variant of this engine, as shown in FIG. 22.

The electric power producing variations of the FPFS engine herein disclosed are particularly well suited to a number of emerging technologies, as well as traditional applications. For example: distributed generation has not historically been as widely employed as could be possible with the improved efficiency of the FPFS engine. Automotive vehicles (including hybrids) could substantially benefit from the present FPFS engine as well. Also, many common applications, including engine driven pumps and compressors could benefit from the FPFS engine by virtue of lower fuel consumption, lower emissions and fuel flexibility.

Small aircraft propulsion could benefit from the FPFS engine, as there are currently underway extensive efforts to replace the high-octane fuels used in existing spark ignited reciprocating engines with Diesel or Jet fuel powered engines. The multi-fuel capability of the FPFS engine, and its lower fuel consumption, make it a viable contender for a wide range of aviation propulsion applications. It is also possible that some existing gas turbine applications, such as small turbo-prop or rotary wing aircraft, could be more economic in operation, if designed around the present FPFS engine. The power turbine variant of the present FPFS engine would be the most preferred embodiment of this invention in aircraft applications.

Many marine applications could also benefit from the characteristics of the FPFS engine disclosed by this invention. An outboard engine and stern-drive version of the FPFS engine can even be envisioned (hydraulic output from the present FPFS engine to an axial piston hydraulic motor driving the propeller).

Small engine powered tools such as chain saws and lawn mowers are further viable candidates for the present FPFS engine. A key element of this application is low cost electronic control. Nonetheless, for such a high volume engine it is anticipated the control could be reduced to an economic single microchip.

Micro-engine versions of the present FPFS engine can be envisioned. The free piston and floating stroke features of the present FPFS engine are amenable to the processes being developed to produce micro-engines. Also, the operating characteristics of the present FPFS engine are well suited to many proposed applications of micro-engines.

BRIEF DESCRIPTION OF THE DRAWINGS

FIG. 11A is the horizontal cross section, A-A in FIG. 11B, through the centerline of the lower cylinder, of a cylinder head in an eighth preferred embodiment of the present invention having an alternate valve operating arrangement that utilizes a single camshaft for each cylinder driven by a stepper motor.

FIG. 11B is a top view of the cylinder head in the eighth preferred embodiment of the present invention, with its valve cover removed.

FIG. 11C is a left side view of the cylinder head in the eighth preferred embodiment of the present invention.

FIG. 11D is a right side view of the cylinder head in the eighth preferred embodiment of the present invention.

FIG. 18A is similar to the left side view of the ninth preferred embodiment shown in FIG. 17A, but with the valve cover removed.

FIG. 18B is top view of the ninth preferred embodiment, similar to FIG. 16A, but with a horizontal cross-section taken through the centerline of the engine's upper piston pair.

DESCRIPTION OF THE PREFERRED EMBODIMENTS

Figure 1A:
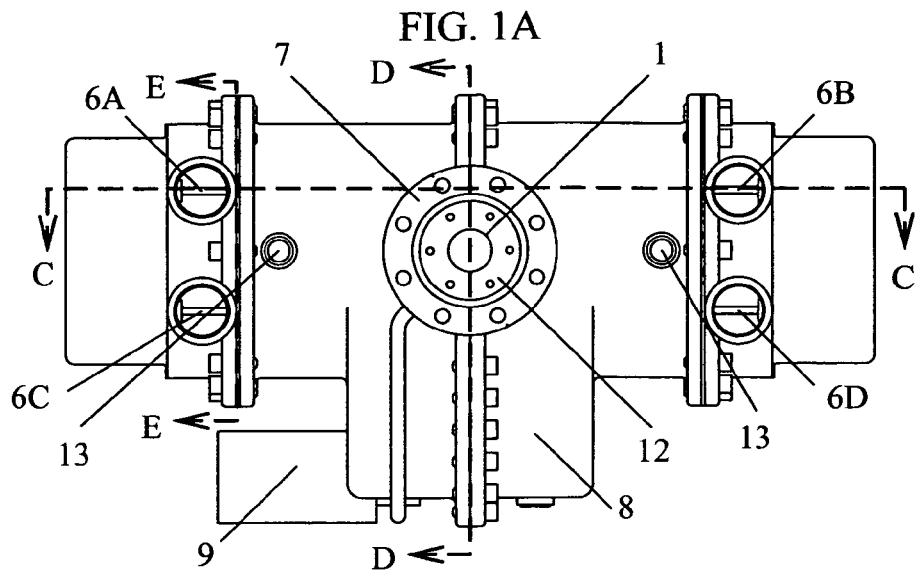
FIG. 1A is a front view of the most preferred embodiment of the present invention comprising a four cylinder, four cycle, premixed charge compression ignition, free piston, internal combustion engine core (without air and fuel induction components) that has a variable (floating) piston stroke, with the engine block arrangement comprising two parallel cylinders with two back-to-back pistons in each cylinder.

Facilitating premixed charge compression ignition in an internal combustion reciprocating piston engine, with the objective of improving engine efficiency and lowering emissions—while avoiding the complexities, sensitivities and cost penalties of existing PCCI/HCCI designs—are the criteria for using the four-cycle, four-cylinder, free piston engine configuration for this invention. The application of PCCI/HCCI to a four-cycle, four-cylinder, free piston engine is unique. As will be disclosed herein, there are multiple engine geometries that can achieve the previously cited objectives, and provide various embodiments of the present invention. Thus, FIGS. 1-10 and FIGS. 16-20 illustrate a number of preferred embodiments of the present invention with varying piston arrangements and power extraction strategies. FIGS. 1-7 show a "flat" four-cylinder block 2, with the pistons 23, connected via connecting rods 25, of varying types, to a pivot shaft 1, which provides for direct power extraction. FIGS. 16-19 show a four-cylinder "quad" block 1601, with its pistons 23, connected via connecting rods 25, but with indirect power extraction. FIG. 8 illustrates the flat block geometry (shown by the number 2, in FIG. 1) utilizing a "Scotch Yoke" 82 & 83, type of piston 23, connection with the connecting links 81, and each rocker arm 84. FIG. 9 illustrates a rack 92, joining pistons 23, into a pair and pinion 91, interconnecting the piston pairs. FIG. 10A illustrates a hydraulic piston 1003, interconnected by tie rod 1001, to the pistons 23 to form piston pairs. In FIGS. 10B and 10C the pistons 23, are joined by tie rod 1010 into pairs, and the piston pairs are interconnected by a solid tie bar 1011. It is important to note that these strategies illustrated herein are not exhaustive of the means by which the pistons 23, and piston pairs may be joined and interconnected to provide for concurrent or opposing reciprocation, but merely serve to illustrate the variety of possible mechanisms that satisfy the requirement of providing a floating "stroke".

Direct power extraction can be attained either from linear oscillations of 1011, such as illustrated in FIG. 10, (as long as a variable stroke length is acceptable for the driven output device) or from a pivoting shaft 1 as shown in FIGS. 1-9. FIGS. 14 and 15 illustrate a variable stroke piston type of compressor and variable stroke linear alternator respectively. The linear hydraulic pump and linear alternator are well known means of power extraction from a linear free piston engine. Various mechanical means of direct power extraction, such as one way or overrunning clutches and gearing are also possible.

Figure 12:
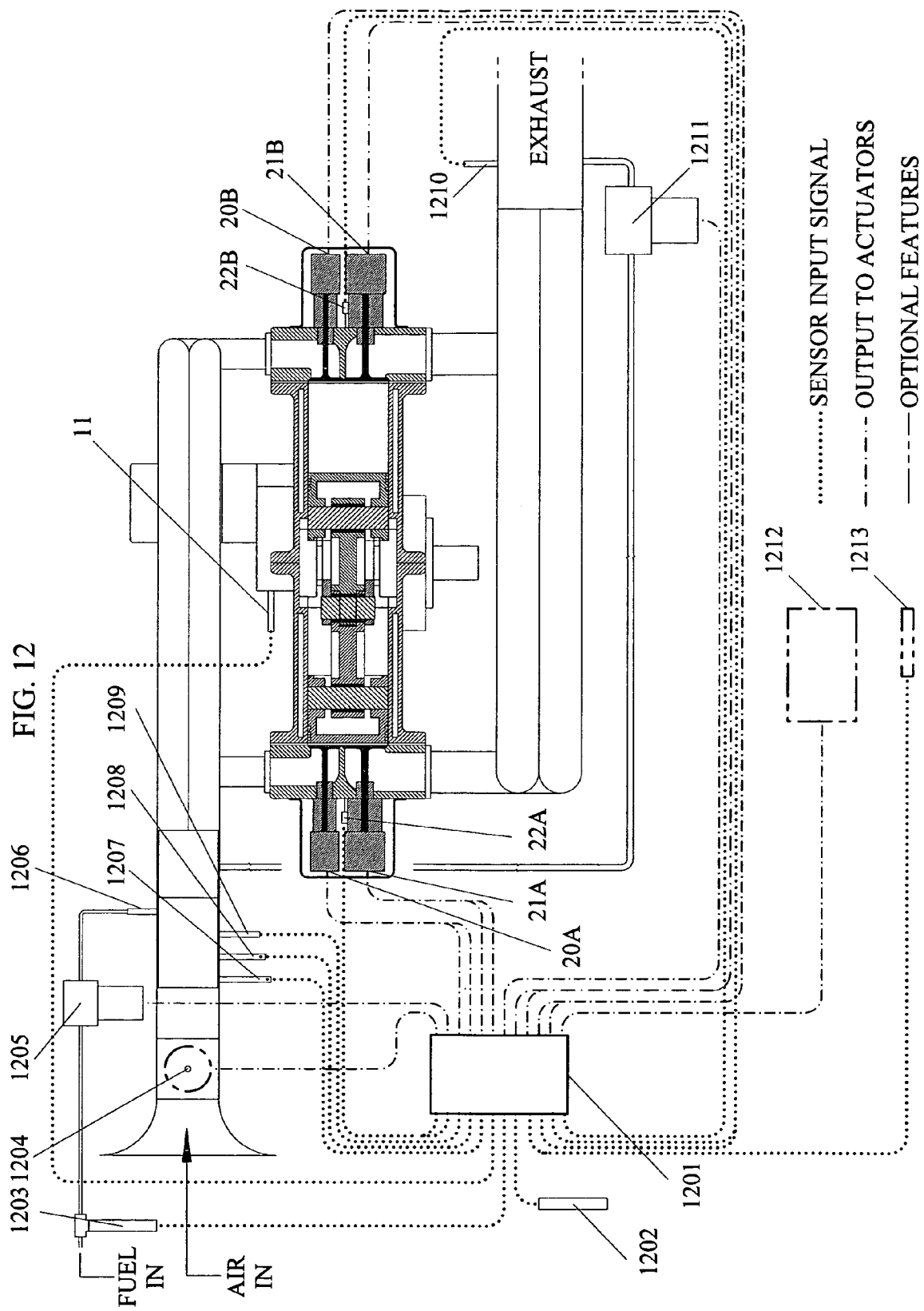
FIG. 12 is a schematic of the control components of the most preferred embodiment of the present invention engine, utilizing an adaptive electronic control and variable valve timing.
Figure 13:
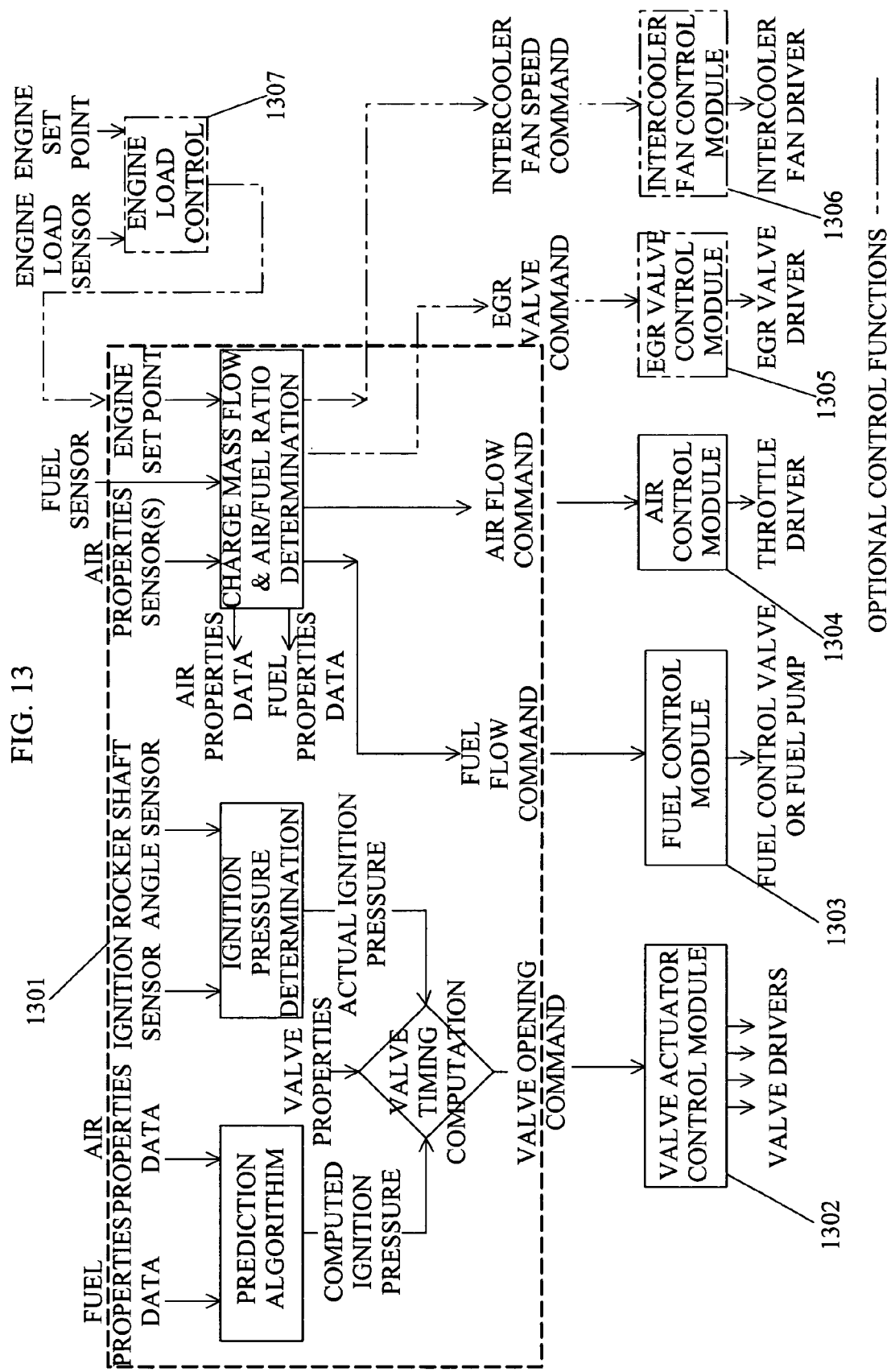
FIG. 13 is a block diagram of the most preferred embodiment of the adaptive engine control in the present invention.

Indirect power extraction is best accomplished by using a power turbine on the engine exhaust, as shown in FIGS. 16-22. This method of indirect power extraction has a significant advantage, compared to direct power extraction, when higher engine pressures are generated. By eliminating the constraint imposed by the crankshaft and connecting rods of conventional engines higher peak pressures can be tolerated. Also, the efficiency of power turbines increases with higher pressure. In addition, the power turbine recovers a higher percentage of energy then does a piston alone (hence the common use of turbo-charging and more recently turbo-compounding). FIG. 11 discloses a variable valve actuation mechanism using stepper or torquer motor driven camshafts for each cylinder. FIGS. 12 and 13 disclose an adaptive engine control for optimization of the valve timing.

As illustrated in FIG. 1A—front view, 1B—top view and 1c—right end view, the engine power output is taken from the pivot shaft 1, which provides an oscillating motion—unlike the rotary motion of conventional reciprocating piston engines. The engine is comprised of: the cylinder block, left 2A, cylinder block, right, 2B, cylinder head left 3A; cylinder head right 3B; valve cover left 4A and valve cover right 4B. Each of the four cylinders has an air/fuel charge intake port and exhaust port. Cylinder 1 intake port is identified as 5A, cylinder 2 intake port is 5B, cylinder 3 intake port is 5C and cylinder 4 intake port is 5D. Cylinder 1 exhaust port is 6A, cylinder 2 exhaust port is 6B, cylinder 3 exhaust port is 6C and cylinder 4 exhaust port is 6D. The housing for the front bearing and pivot shaft seal 7 has the front shaft seal retainer 12 located within it. The engine oil pan/sump 8 is contained in the lower section of each of the cylinder blocks 2A and 2B. The oil pump 9 is external to the oil pan/sump and is motor driven. The engine starter motor 10 can also function as an alternator. Pivot shaft 1, position is measured by angle sensor 11. Engine coolant circulates through the block, 2A and 2B, and cylinder heads 3A and 3B, then to an external heat exchanger—through inlet/outlet ports 13.

Figure 2:
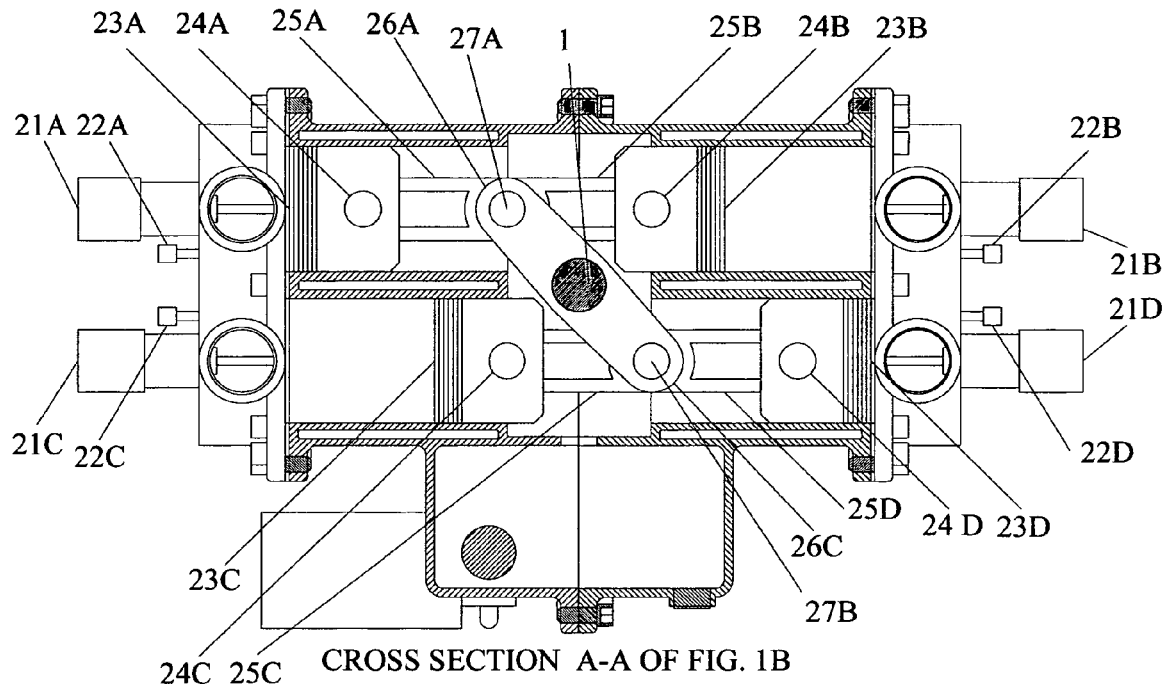
FIG. 2 is a partial cross section of the most preferred embodiment of the present invention; view A-A through the vertical plain of the engine in FIG. 1B, where an upper and lower piston pair are joined by connecting rods to rocker arms fixed to a pivot shaft, with all four pistons shown at full stroke, and further where variable valve timing is employed with an adaptive electronic control and electro-hydraulic valve operators.

FIG. 2 is a front view, as shown in FIG. 1A at cross section A-A. This is a view at the engine block centerline through a vertical plain of the cylinder but around the periphery of the pistons—see section A-A a shown in FIG. 1C. Note: The cylinder heads are shown with valve covers removed, to show the valve actuators and ignition sensor, but are not in cross section. Conventional style pistons and cylinders, similar to those used in existing four cycle Diesel engines, are used. The pistons for cylinders 1, 2, 3 and 4 are designated 23A, 23B, 23C and 23D respectively. Pistons 23A and 23B, at opposite ends of rods 25A and 25B, are designated a piston pair and pistons 23C and 23D, at opposite ends of rods 26A and 26B, are a second piston pair. The front and rear rocker arms for cylinder 1 and 2, item 26A and 26C (not visible) respectively, are attached to the pivot shaft, 1 directly opposite front and rear rocker arms for cylinders 3 and 4, 26B and 26D (not visible in FIG. 2, see FIG. 3) respectively. Connecting rods 25A, 25B, 25C and 25D are attached to the respective rocker arms by pins 27A and 27B and to the respective pistons by pins 24A, 24B, 24C and 24D. This connection joins two piston pairs with each other such that the motion of one piston pair is opposite that of the other piston pair. The length of rocker arms from the pivot shaft is made of sufficient length, such that the stroke of the pistons is not limited by the rocker arm travel. Note: In a four-cycle, four-cylinder engine each of the compression, expansion, exhaust and intake cycles are present at any given time, in one cylinder or the other. The expansion cycle of one cylinder drives the compression cycle of another. Thus, in the FPFS engine the length of piston travel is always constrained by the opposing pressure of a compression cycle. The stroke length of the piston in the exhaust cycle is determined by the ignition event in the cylinder then in a compression stroke. The compression ignition is a function of a series of air/fuel parameters, which will vary to some extent from cycle to cycle. The stroke length of any given cycle is indeterminate until charge ignition occurs. Each piston compression stroke length is independent of the other and the piston motion is completely free of mechanical stroke length limitations. This mechanism allows the stroke length to vary, or "float", according to the compression ratio required to ignite the charge of each compression cycle, fully independent of any other cylinders compression stroke. The pistons, if not constrained by the charge pressure of a compression cycle, would ultimately stop against the cylinder head. Very high compression ratios (and hence auto-ignition temperatures) can be attained with the free piston floating stroke, thereby improving engine efficiency and providing an accommodation for the characteristics of many different fuels. However, the higher potential efficiency of the free piston PCCI/HCCI engine is not a result of the engine compression ratio itself. Rather, the potentially greater efficiency of this type of engine is due to the expansion ratio available as a result of constant volume combustion that occurs in this engine (as opposed to variable volume combustion experienced by other types of internal combustion reciprocating piston engines). The constant volume combustion occurs due to the fact that the compression ignition detonation that occurs in a PCCI/HCCI engine is so rapid that the piston has not had time to move (which would increase volume) during the time it takes for the detonation. Note: PCCI/HCCI engines are inherently multi-fuel capable as they are not constrained by issues in conventional engines such a spark ignition or fuel injector timing.

True premixed charge compression ignition, similar to that attained by linear piston engines or in laboratory tests using a rapid compression-expansion machine, can be attained in the FPFS engine. This allows very lean fuel mixtures to be utilized, resulting in very low emissions and high efficiencies.

Two-cycle linear free piston engines have shown to be very limited in speed range and power turn down. On the other hand, four-cycle PCCI/HCCI rotary shaft engines are extremely sensitive to fuel characteristic and ambient condition variations, due to having a fixed stroke. Elaborate charge condition monitoring and control must be employed to get these engines to function. The FPFS engine introduced herein is free of the foregoing limitations and constraints and is capable of functioning over a wide speed and power range.

The variable stroke characteristic of the FPFS engine does, however, benefit greatly by the use of variable valve geometry. Also, the load imposed on the engine must accommodate the varying stroke, or power must be extracted from the engine in an indirect manor.

An electro-hydraulic variable valve configuration, such as supplied by Sturman Inc., is shown in FIG. 2. Each valve has an independent actuator. Cylinder 1, 2, 3 and 4 exhaust valves are identified as 21A, 21B, 21C and 21D respectively. Cylinder 1, 2, 3 and 4 intake valve actuators are identified as 20A, 20B 20C and 20D respectively (not shown in this view). Each cylinder has an ignition detection sensor, preferably a piezo-electric pressure transducer or UV sensor. The ignition sensors for cylinder 1, 2, 3 and 4 are identified as 22A, 22B, 22C and 22D respectively. An important element of valve operation is the proper timing of the exhaust valve opening. If the exhaust valve were to open prior to the expansion cycle in one cylinder sufficiently driving the compression cycle in another cylinder to the ignition point of the charge, then the continuous operation of the engine would likely fail. To achieve the desired valve timing, the ignition sensor signals the control when the ignition occurs. The timing of that signal, along with data from conventional engine sensors, is used by the control to open the exhaust valve in the cylinder. The complete set of control functions will subsequently be addressed in greater detail.

Figure 3:
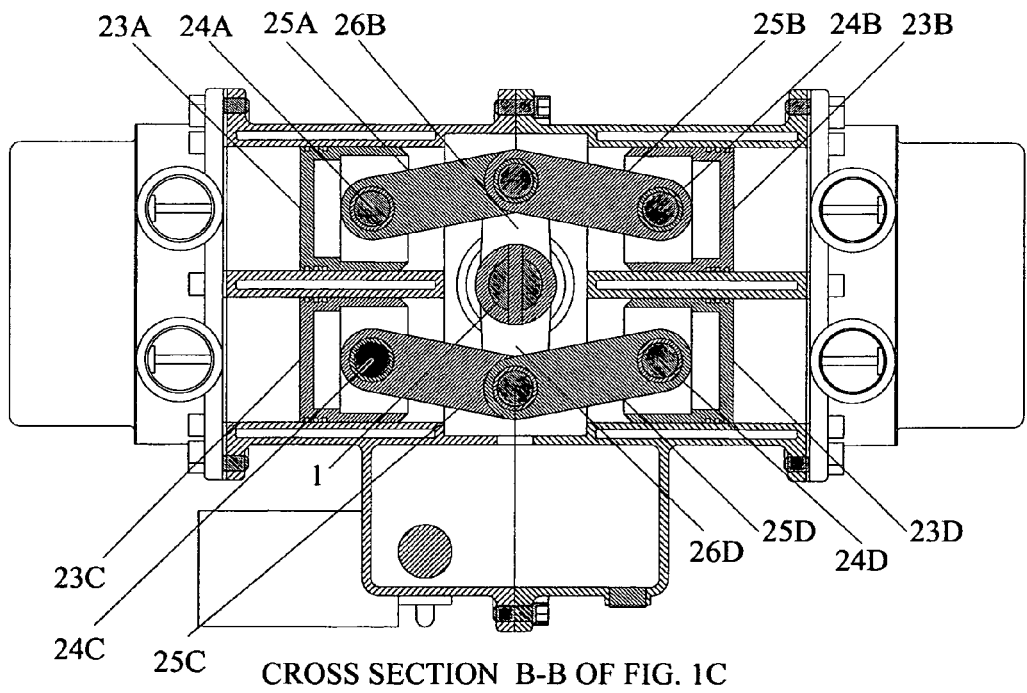
FIG. 3 is a partial cross section of the most preferred embodiment of the present invention; view B-B through the vertical plain of the engine in FIG. 1C, with all four pistons shown at mid stroke.

FIG. 3 is cross section B-B of FIG. 1A, which shows the rear rocker arms 26B and 26D. It also illustrates the relative motion between pistons, connecting rods, rocker arms and pivot shaft as the pistons move from the full stroke shown in FIG. 2 to mid stroke as illustrated in FIG. 3. Note that the lateral/side motion of the connecting rods, in respect to the pistons, is significantly less than that experienced by a conventional reciprocating engine with a rotating crankshaft and connecting rods. This reduced lateral/side motion reduces the side thrust on the pistons as well as the relative motion of the connecting rods to the piston and rocker arm pins thereby lessening the wear on these component parts (compared to a conventional engine).

Figure 4:
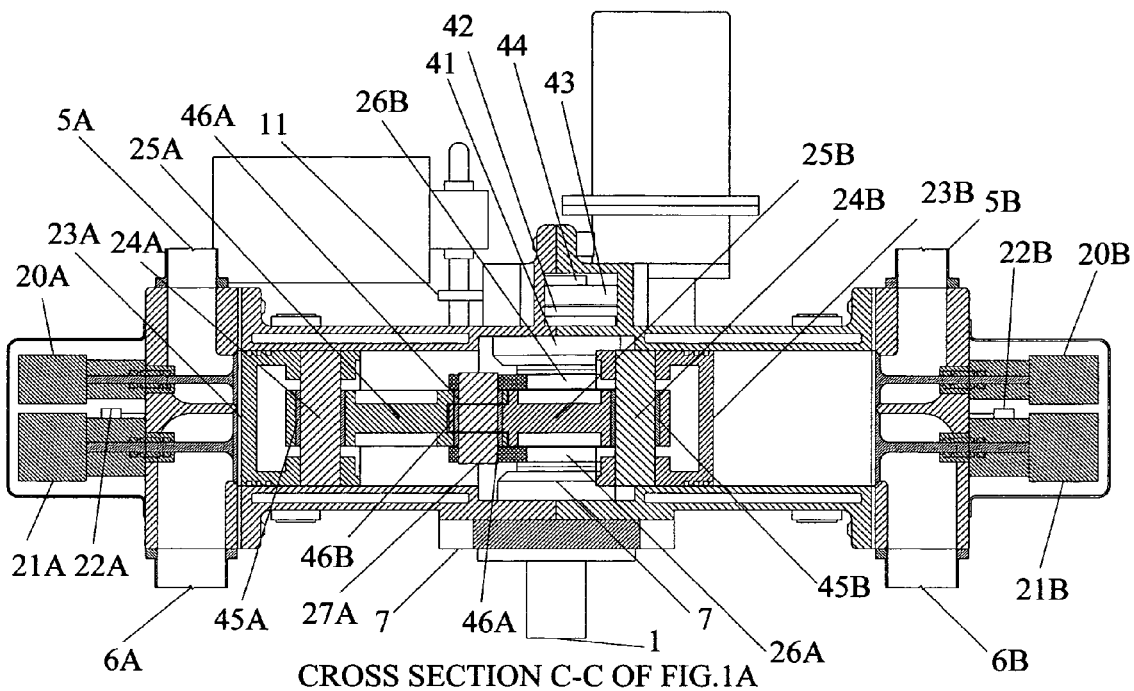
FIG. 4 is a cross section of the most preferred embodiment of the present invention; view C-C through the centerline of the upper piston pair of the engine in FIG. 1A, with visible pistons shown at full stroke.

FIG. 4 is horizontal cross section C-C of FIG. 1A which is taken through the centerline of the upper cylinders. The cylinders are shown at full stroke. Note how the connecting rods 25A and 25B fit up at with the rocker arms, 26A and 26B and pin 27A. This end of 25A is bifurcated and the mating end of 25B fits between the two sides of 25A. These ends are carried on pin 27A held by bearings 46A and 46B respectively. The opposite ends of the connecting rods, 25A and 25B are supported in the piston pins 24A and 24B held by bearings 45A and 45B respectively. In this view, both the front bearing and seal housing, 7, and the rear bearing and seal housing, 41, may be seen along with the rear bearing and seal housing retaining plate, 42. The starting gear sector, 43, and starting gear sector retaining plate, 44, are also visible. While not seen in this view, the connecting rods, rocker shaft and pistons for the lower cylinders are similarly joined and supported by bearings 45C, 45D, 46C and 46D.

Figure 5:
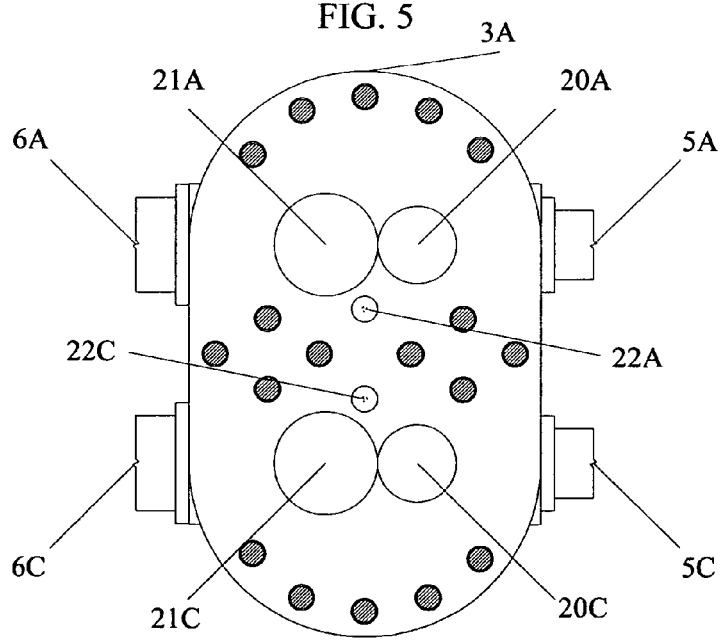
FIG. 5 is an end view of the most preferred embodiment of the present invention, E-E through the vertical plain of FIG. 1A, at the face of the left hand cylinder head.

FIG. 5 is vertical cross section E-E Of FIG. 1A taken at the junction of the cylinder head, 3A, and the cylinder block 2A. It shows the relative position of valves 20A, 20C, 21A and 21C in respect to each other and ignition sensors 22A and 22C.

Figure 6A:
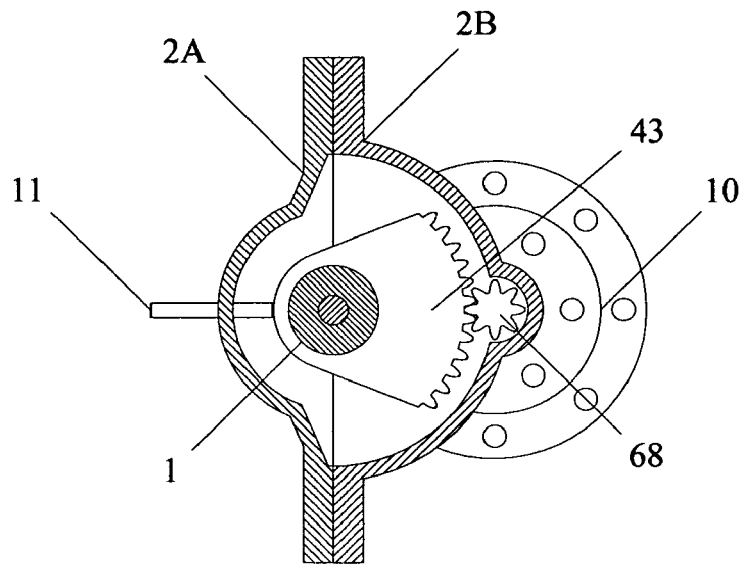
FIG. 6A is a cross section view of the most preferred embodiment of the present invention, F-F, through the vertical plain of FIG. 1B showing an arrangement of gearing connecting a starter motor to the engine.

FIG. 6A is vertical cross section F-F of FIG. 1A taken through the starting gear housing. Gear sector, 43, is mounted on the end of the pivot shaft, 1, and is driven by starter motor sprocket, 68. Angle sensor, 11, measures the pivot shaft angle and continuously sends a signal to the engine control. When the gear sector, 43, is near the end of travel, and hence the pistons are at maximum stroke, the control reverses the direction of the starter motor. The starter depicted herein is a high-speed permanent magnet or switched reluctance motor with a planetary gear speed reducer between the motor and sprocket gear. When the engine starts the sprocket may be disengaged, by conventional mechanisms.

Figure 6B:
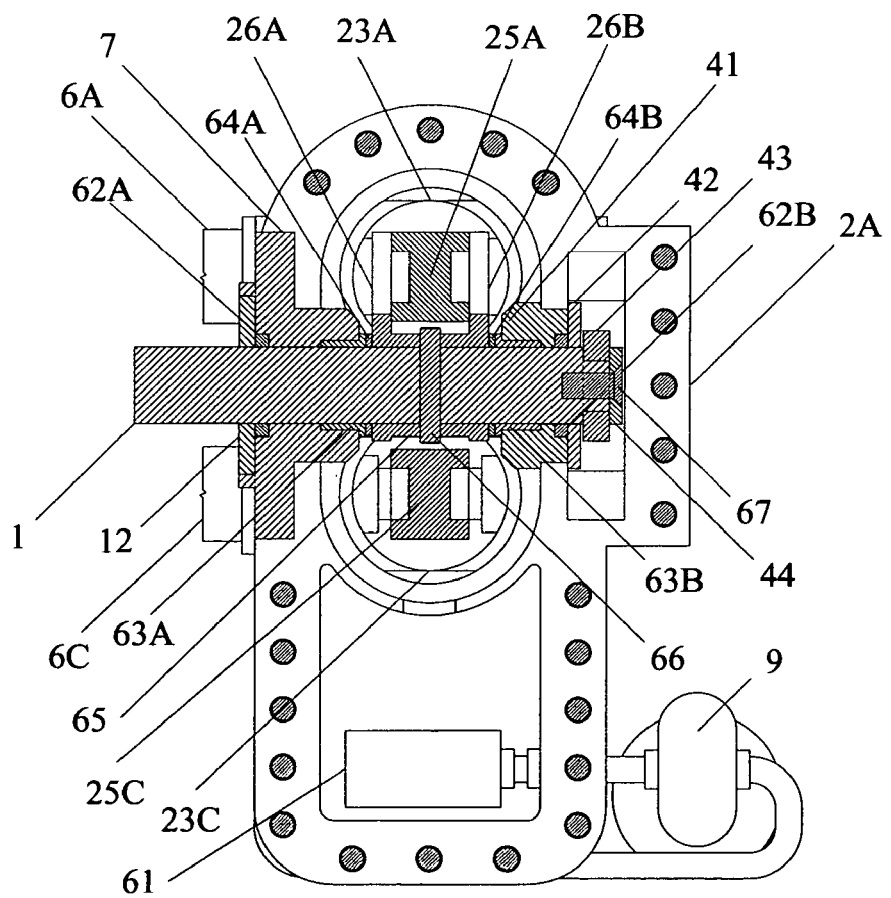
FIG. 6B is a vertical cross section view of the most preferred embodiment of the present invention, D-D, through the centerline of FIG. 1A, looking toward the left cylinder bank.

FIG. 6B is vertical cross section D-D of FIG. 1A taken at the line between cylinder 2A and 2B, looking toward the left side of cylinder block, 2A. This view illustrates the placement of front and rear shaft seals 62A and 62B, front and rear bearings 63A and 63B, front and rear thrust washers 64A and 64B within front and rear bearing and seal housing 7 and 41 respectively, along with front and rear seal retaining plates 12 and 42 respectively. In addition, rocker arm spacer, 65 and rocker arm locating pin, 66, illustrate one of several possible methods of attaching the rocker arms to the pivot shaft, 1. Lubricating oil is taken in through filter, 61, by oil pump, 9, and distributed through passages (not shown) within the pivot shaft, rocker arms, pins and connecting rods using conventional methods employed in rotary reciprocating engines. Retaining screw, 67, can be clearly seen clamping plate, 44, to retain starting gear sector, 43, on the pivot shaft, 1.

Figure 7A:
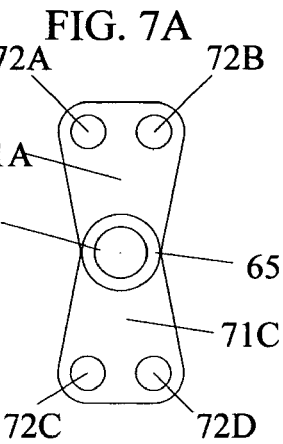
FIG. 7A is a detail view of the dual pin rocker arm of the second preferred embodiment of the present invention shown in FIG. 7B.

FIG. 7A is illustrates an alternate duplex rocker arm configuration, 71A, 71B (upper) and 71C, 71D (lower), front and rear respectively—replacing 26A, 26C and 26B, 26D shown in FIG. 2 and FIG. 3 respectively. In this arrangement each connecting rod, 25A, 25B, 25C and 25D, is provided a separate connecting pin, 72A, 72B, 72C and 72D respectively. This eliminates the need to bifurcate the connecting rods—as is illustrated in FIG. 4.

Figure 7B:
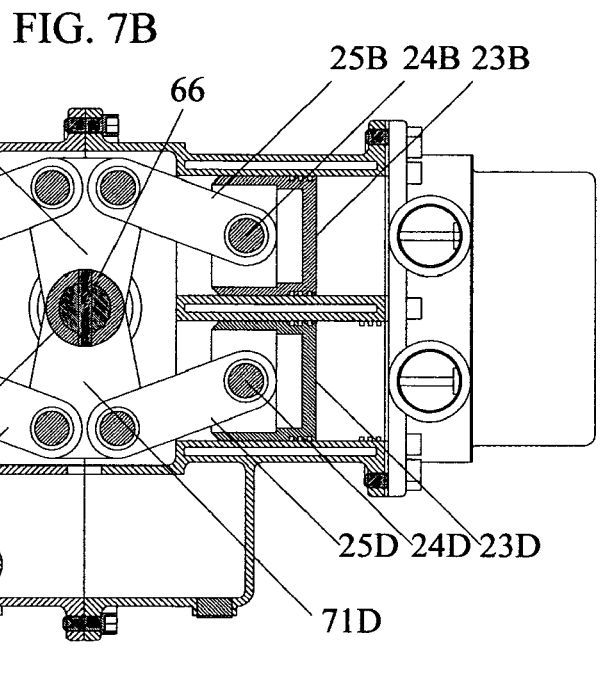
FIG. 7B is a cross section of a second preferred embodiment of the present invention in the same manner as FIG. 3 with an alternate connecting rod joining method, which uses a dual pin rocker arm, and all four pistons shown at mid stroke.

FIG. 7B is similar to cross section B-B of FIG. 3, showing the pistons at mid stroke, but with the duplex rocker arm 71B/D utilized.

Figure 7C:
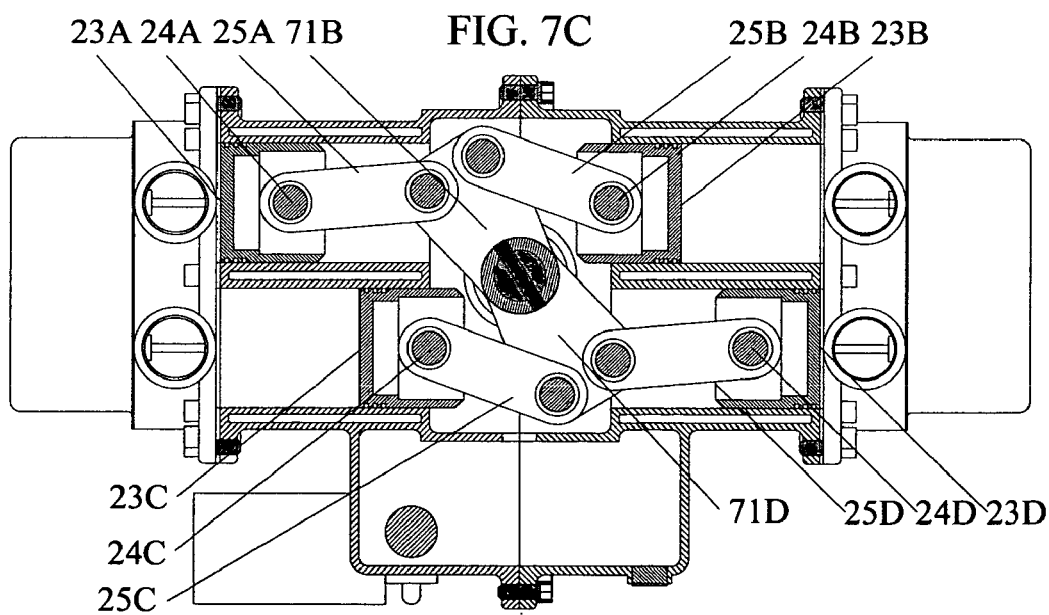
FIG. 7C is the same view of the second preferred embodiment of the present invention as shown in FIG. 7B but with all four pistons at full stroke.

FIG. 7C is similar to FIG. 7B but shows the pistons at full stroke (as shown in FIG. 2).

Figure 8A:
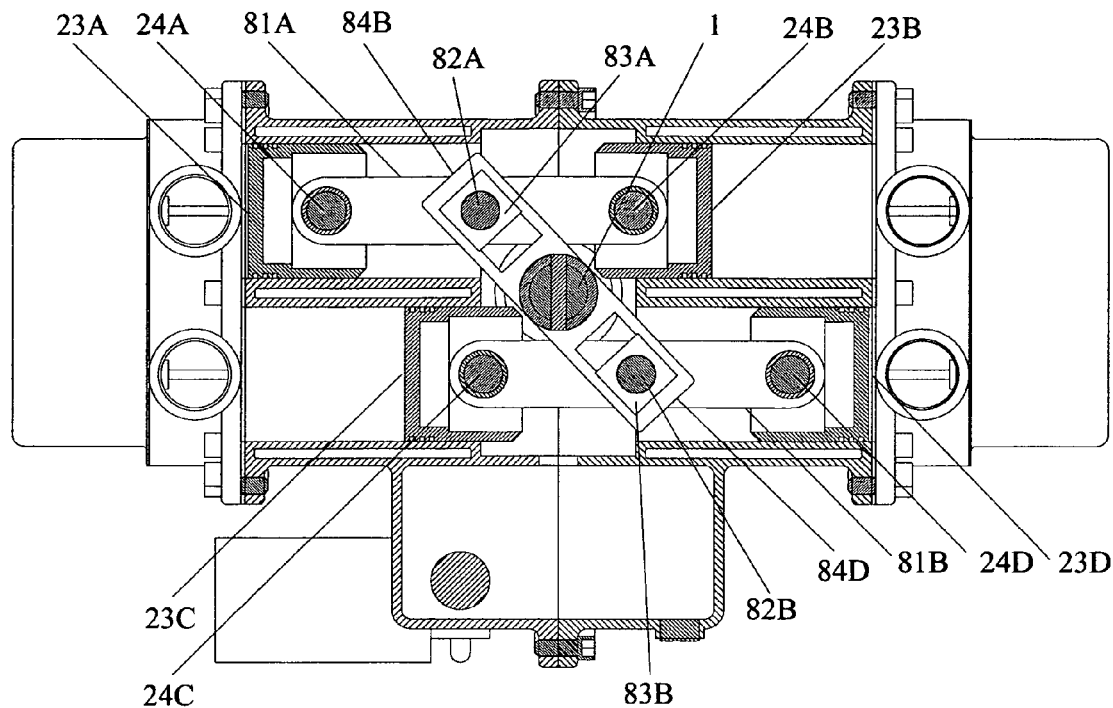
FIG. 8A is a cross section of a third preferred embodiment of the present invention in the same manner as FIG. 3 but with an alternate connecting rod joining method, which uses a Scotch-Yoke mechanism between the connecting rod and rocker arm, with all four pistons shown at full stroke.

FIG. 8A is a cross section in the same manner as FIG. 3 with an alternate connecting rod joining method, which uses a Scotch-Yoke type of mechanism between the connecting rod and rocker arm. The pistons are shown at full stroke. The connecting links, 81A (cylinder 1 & 2) and 81B (cylinder 3 & 4), between the pistons 23A/23B and 23C/23D respectively, are rigid members with link pins 82A (cylinder 1 & 2) and 82B (cylinder 3 & 4) respectively, affixed perpendicular to the links. The link pins 82A and 82 B mate with slides 83A and 83B respectively. The slides 83A (cylinder 1 & 2) and 83B (cylinder 3 & 4) move within tracks cut into rocker arms 84B and 84D respectively. This shows that the rocker arm and pivot shaft mechanism can be readily adapted to a Scotch-Yoke arrangement, when in a particular application it is desirable to further reduce side forces on the pistons.

Figure 8B:
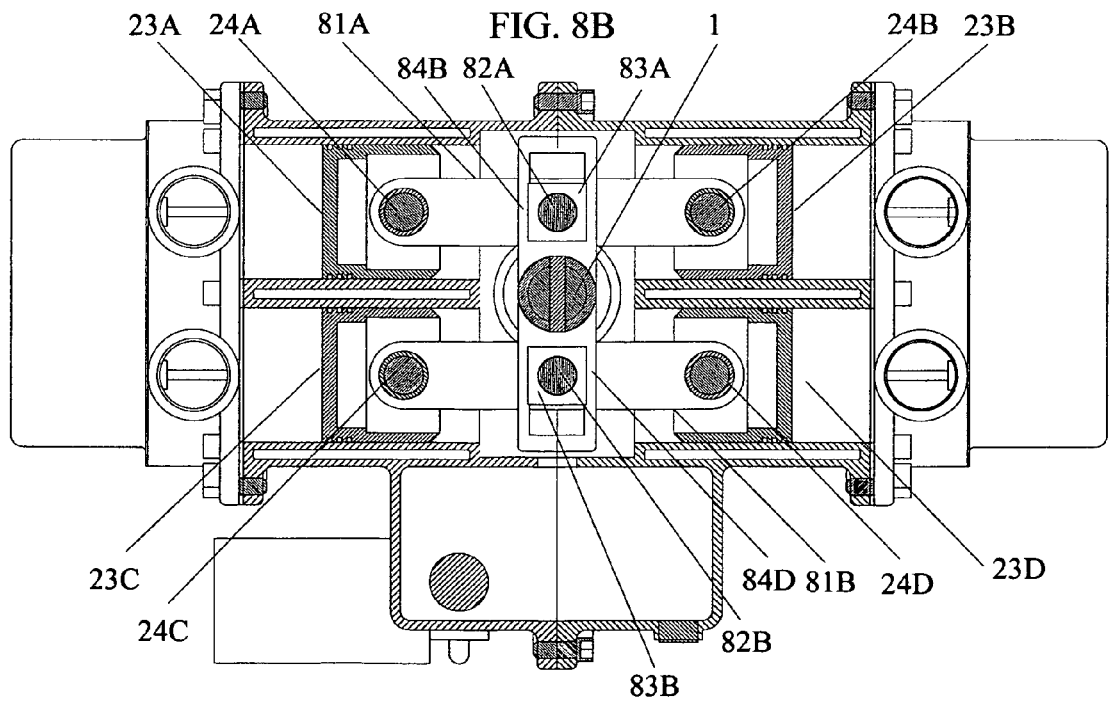
FIG. 8B is the same view of the third preferred embodiment of the present invention as FIG. 8A but with all four pistons shown at mid stroke.

FIG. 8B is the same as 8A but with the pistons at mid stroke. Note the inward movement of slides 83A and 83B along the rocker arms 26B and 26D compared to FIG. 8A.

Figure 9A:
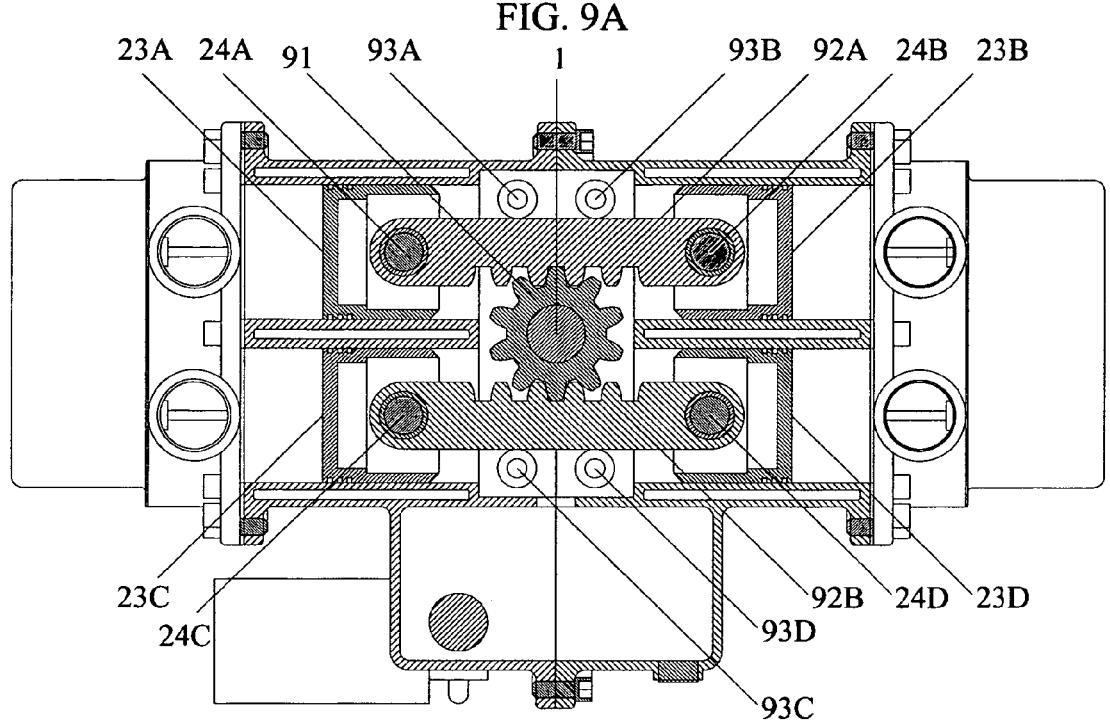
FIG. 9A is a cross section of a fourth preferred embodiment of the present invention in the same manner as FIG. 3, but with an alternate method of coupling the cylinder pairs, comprising a rack and pinion mechanism instead of a rocker arm and pivot shaft, with all four pistons shown at mid stroke.
Figure 10A:
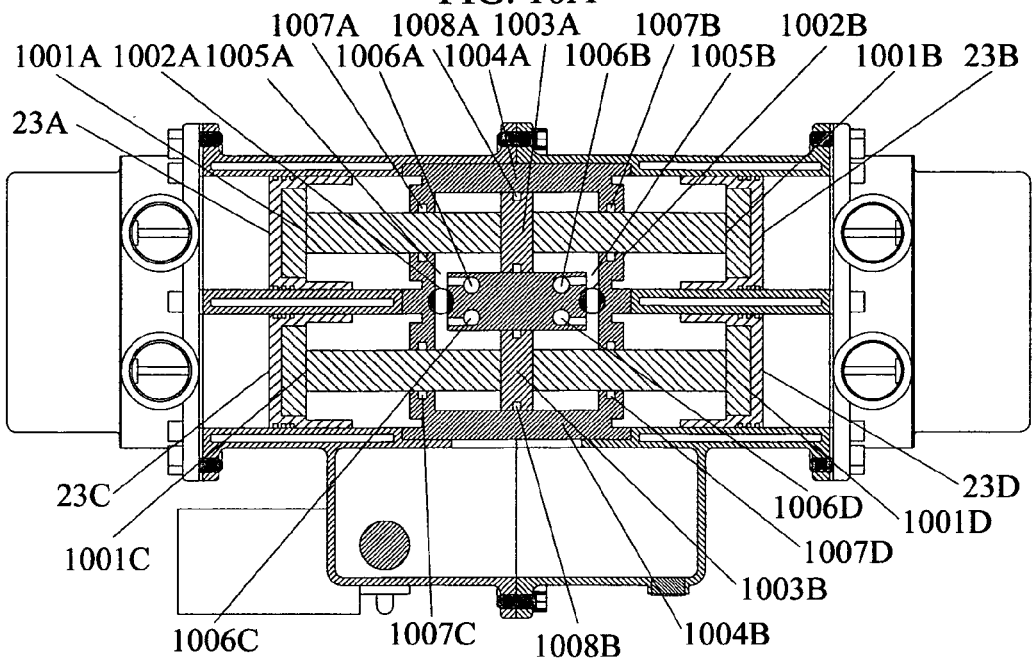
FIG. 10A is a cross section of a sixth preferred embodiment of the present invention in the same manner as shown in FIG. 3 wherein coupling the cylinder pairs comprises two hydraulic pistons being utilized to interconnect the piston pairs, and all four pistons are shown at mid stroke.
Figure 10B:
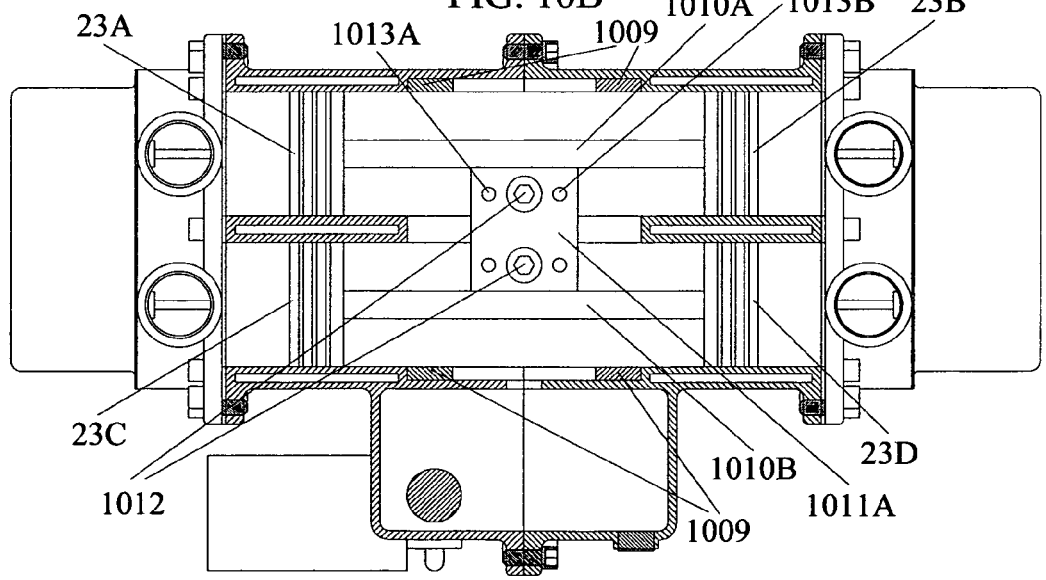
FIG. 10B is a cross section of a seventh preferred embodiment of the present invention in the same manner as shown in FIG. 3 wherein the piston pairs are interconnected by a solid tie-bar.

FIG. 9A is a cross section in the same manner as FIG. 3, but with an alternate method of coupling the cylinder pairs. A rack and pinion mechanism is used instead of a rocker arm and pivot shaft. In this configuration a pinion gear, 91, is fixed on the pivot shaft, 1, and meshes with two gear racks in connecting link 92A and 92B. The connecting links 92A and 92B join upper pistons 23A and 23B and lower pistons 23C and 23D respectively. A movement by the upper piston set will result in a rotation of the pinion gear 91 which in turn translates into a directly proportionate motion in the opposite direction by the lower piston set. This mechanism allows the stroke length to vary, or "float", according to the compression ratio required to ignite the charge on each compression cycle, fully independent of any other cylinders compression stroke—in the same manner as the rocker arm and pivot shaft design. Roller bearings, of the cam-follower type, are illustrated in 93A, 93B, 93C and 93D for carrying the thrust load imparted onto links 92A and 92B by the pinion gear 91. This configuration results in a more compact unit than the rocker arm and pivot shaft arrangement previously shown. However, rack and pinion gear materials and gear dimensions must be carefully selected so as to be sufficient to carry high peak forces.

Figure 9B:
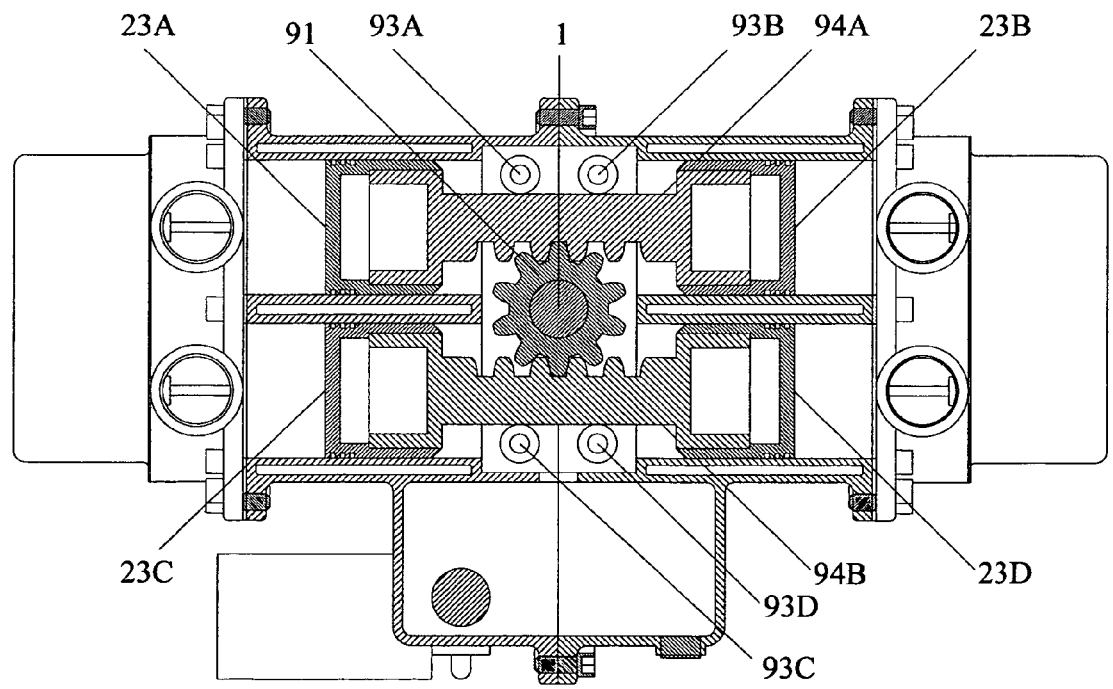
FIG. 9B is a cross section of a fifth preferred embodiment of the present invention similar to that shown in FIG. 9A but with the piston pairs joined by a rigid connecting rod.

FIG. 9B is the same as FIG. 9A with the exception that the links 94A and 94B are rigidly affixed to the pistons. This eliminates piston pins 24A, 24B, 24C and 24D. A rigid coupling of the piston pairs reduces piston side play and associated wear. However, piston and cylinder tolerances will be tighter and parts will be more costly to produce in this arrangement, compared to the foregoing.

FIG. 10A is a cross section, in the same manner as FIG. 3, with an alternate method of coupling the cylinder pairs. The pistons are shown at mid stroke. A split housing, 1004A and 1004B contains two hydraulic cylinders. A hydraulic piston, 1003A, is connected to each upper piston, 24A and 24B, by means of piston tie rod 1001A and 1001B respectively. Also, a hydraulic piston, 1003B, is connected to each lower piston, 24C and 24D, by means of piston tie rod 1001C and 1001D respectively. A hydraulic cylinder cross-port, 1005A and 1005B, interconnect the hydraulic cylinders at the end of each cylinder and are utilized to interconnect the piston pairs. A pair of rotary shut off valves, 1002A and 1002B, are placed within the port to close off fluid flow between the cylinders during engine starting. The valves, 1002A and 1002B, are externally actuated. Also located within the cross-ports, 1005A and 1005B, are passages 1006A, 1006B, 1006C and 1006D which lead to a pair of external directional control valves, one for each hydraulic cylinder. During starting the directional control valves are cycled to drive each of the hydraulic cylinders in opposite direction. Once the engine is started, the directional control valves are set in neutral, closing of all external hydraulic fluid flow. The internal cross-port valves 1002A and 1002B are opened full and the combustion expansion cycle drives the pistons, in each piston pair, in opposite directions. This mechanism allows the stroke length to vary, or "float", according to the compression ratio required for ignition of the charge on each compression cycle, fully independent of any other cylinders compression stroke—the same as the rocker arm and pivot shaft design and the rack and pinion design. Seals 1007A, B, C and D seal the tie rod to the engine crankcase. Seals 1008A, B, C and D seal the hydraulic pistons within the hydraulic cylinders.

Figure 10D:
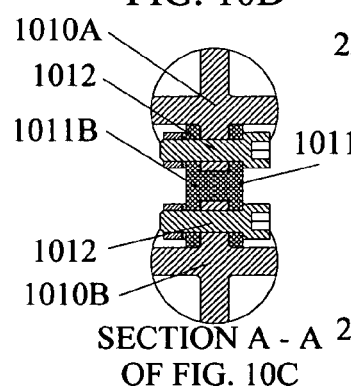
FIG. 10D is a cross section of the seventh preferred embodiment of the present invention; section A-A in FIG. 10C, with the two piston pairs interconnected by a solid tie-bar.
Figure 10C:
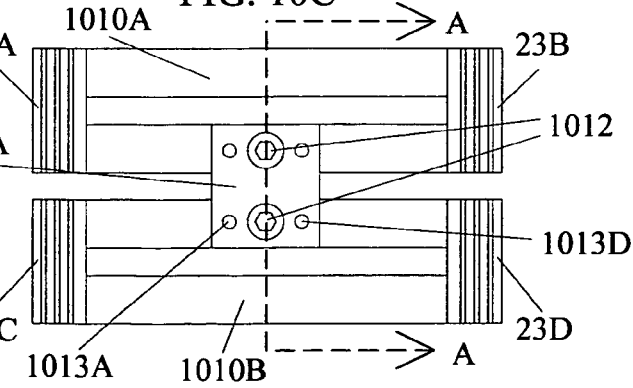
FIG. 10C is an enlarged view of the piston pairs in the seventh preferred embodiment of the present invention interconnected by a solid tie-bar.

FIG. 10B is a cross section in the same manner as FIG. 10A but with the piston pairs formed by joining pistons 23A & 23B, 23C & 23D with solid tie-rods 1010A and 1010B, respectively. The tie-rod and pistons may be separate pieces, joined by a variety of conventional means, or may be constructed from a single piece—as is the case illustrated herein. The two piston pairs are joined by tie-bars 1011A (upper) and 1011B (lower) using alignment pins 1013A, 1013B, 1013C and 1013D by the use of fasteners 1012A and 1012B (nuts and bolts in this case—but other types are feasible). This construction produces a rigid assembly of the two piston pairs, which as a result move concurrently in the same direction. FIG. 10C shows this solid assembly of the piston pairs—which in the instance of the crankcase construction shown could be pre-assembled prior to placement into the cylinder. Note: a single piece, equivalent to the assembled piston pairs, could be produced—albeit with greater difficulty and higher cost than the separately assembled pieces. Alternative, single piece crankcase, construction can be accommodated by the separate piston pairs method by first installing the individual piston pairs and then, through access via the crankcase, joining the piston pairs. The so joined piston pairs (of either foregoing methods) operate in a linear reciprocating motion from which power may be extracted directly by means previously disclosed, such as linear hydraulic pumps and compressors or linear alternators, which could connect to the tie-bars in a variety of well understood means. Power can also be extracted indirectly—e.g. by turbine(s) driven by the exhaust gas. Starting of the engine can also be accomplished by connecting a variety of starting mechanisms, which produce linear reciprocating motion, to the tie-bar—e.g. hydraulic pistons driven from a hydraulic pump and cycled by a control valve. FIG. 10D shows cross section A-A of FIG. 10C and illustrates one method of forming tie-rods 1010A and 1010B such as to provide a convenient means of attachment for the tie-bars 1011A and 1011B. Note the cross configuration of the tie-rod web. For certain applications it may be desirable to utilize guides, 1009, shown in FIG. 10B to reduce side load on the piston pairs (such as is commonly done with a cross head mechanism on larger engines).

FIG. 11 contains four views of a cylinder head utilizing a separate camshaft for each cylinder and with variable valve operation. Each camshaft is operated by a dedicated indexing device or stepper motor. Other valve train components and mechanisms are based on conventional overhead valve design practices. These include: intake valves (I) and exhaust valves (E) 1107AE, 1107CI; valve springs 1105AI, 1105AE, 1105CI, 1105CE; valve guides and seals 1106CI, 1106CE; camshaft bearings 1104CI, 1104CE and bearing housings 1103AI, 1103AE, 103CI, 1103CE.

FIG. 11A is cross section A-A of FIG. 11B through the centerline of camshaft 1101C of cylinder 3. Camshaft 1101C operates valves in cylinder 3. The camshaft is mounted on cylinder head 3A. Cams 1102CE and 1102CI operate the exhaust and intake valves, respectively, of cylinder 3. FIG.

11B is a top view of the cylinder head and camshafts. FIG. 11C and FIG. 11D are left and right side views of FIG. 11B, respectively. Note in FIG. 11B that these cams are depicted 180 degrees in orientation on the camshaft. Camshaft 1101C is depicted in the position such that both intake and exhaust valves are closed. Camshaft 1101A is depicted in the position such that the exhaust valve 1107AE is full open and intake valve 1107AI is full closed. It can be seen, in FIG. 11B, that camshafts 101A and 1101C are oriented 90 degrees from each other. This illustrates that, by rotating the camshaft in 90-degree increments, either both valves can be closed concurrently or the intake valve or exhaust valve can be in an open or closed position—mutually exclusive of each other. That is, both the intake valve and the exhaust valve cannot be open together. Note: Cam profiles can be varied in such a fashion that intake and exhaust valve overlap is possible. Stepper motors, 1108A, and 1108C rotate camshafts 1101A, and 1108C respectively. Rotation may be in 90-degree increments, or less, depending on the amount of valve opening desired. Both the timing of the opening and closing of the valves can be individually controlled. Thus, this design provides a fully variable valve operation and control. The stepper motors, 1108A, and 1108C, each receive independent input from the engine control. Thus, each cylinders valve operation is fully independent of each other.

FIG. 12 is a schematic of the control components of the engine, showing the utilization of an adaptive electronic control and variable valve timing. Electronic control, 1201, has a series of sensor inputs used to collect real time data on charge conditions and engine parameters. The sensors shown are: shaft angle, 11; ignition sensors 22A, B, C and D; engine temperature, 1202; fuel flow, 1203 air temperature, 1207; air pressure, 1208; air flow, 1209; exhaust gas, 1210 and load (on the engine), 1213. There may be more or less sensors and of varying types. For example, the three air sensors could be replaced with a single mass airflow sensor.

Within the control, data from the sensors is analyzed and computations made utilizing information, pertaining to engine and charge parameters, stored in memory. These computations determine to what extent, if any, the engine control devices are adjusted—in order to either maintain a set engine operating condition or to change that set condition.

As shown in FIG. 12, control 1201 provides output to engine control devices using electrical circuits. However, pneumatic and/or hydraulic circuits, alone, or in combination with electrical circuits, can be utilized. The control components shown are: intake valve actuators, 20A, B, C and D; exhaust valve actuators, 21A, B, C and D; throttle position actuator, 1204; fuel flow valve, 1205 coupled to fuel injector, 1206; exhaust recirculation valve, 1211 and a load control device, 1212. Note that exhaust gas recirculation is a common technique used for emissions reduction in conventional Otto cycle engines, particularly automotive engines. The HCCI engine is inherently lower in emissions then an Otto cycle engine but under certain load conditions may nonetheless benefit from EGR. There may be more or less control devices and of varying types. For example, the throttle position actuator would be eliminated in a turbocharged or supercharged engine and the control of engine throttling provided by control of the turbo or supercharger compressor output (see FIG. 16 and FIG. 20). With the exception of the ignition sensor, 22 and the valve actuators, 20 and 21, the other components, sensors and actuators, shown are common items used in existing mass production engines. The ignition sensor, 22, is derived from existing industrial sensors, either pressure sensing, temperature sensing or Ultraviolet (UV) flame detection. Valve actuators, 20 and 21, are commercially available items-but on a limited basis. This control schematic uses a microprocessor typically found in existing automotive engines. However, personal computer or industrial control microprocessors could also be used.

FIG. 13 is a functional block diagram of an adaptive engine control for use on the FPFS engine. The microprocessor and associated memory devices are contained in adaptive control module 1301. Sensor signals are sent into the inputs of this section. The output from this section goes to various modules that provide the appropriate conditioning and driver circuits that are connected to engine control actuator devices. The control modules shown are: valve actuator(s), 1302; fuel control, 1303; air control, 1304, exhaust gas recirculation, 1305; intercooler fan, 1306 and load control, 1307. Within 1301 the engine charge mass flow and air/fuel ratio is determined. From this, the set point commands for: air control, 1304; EGR valve control, 1305 and intercooler fan control, 1306 can be provided. Additionally, air properties data and fuel properties data is provided to the second part of this section. This data is computationally derived from air and fuel properties characteristics stored in memory within this section and from the sensor measurements of actual air and fuel parameters. In the second section of 1301, the air and fuel properties data is passed through an algorithm based on expected engine performance, including the compression pressure and corresponding stroke (and shaft angle or piston position) needed to cause ignition during the compression cycle. From ignition sensors and the shaft angle sensor (or piston position sensor) the actual ignition pressure is determined. The actual ignition pressure is compared to the computed ignition pressure and computations of valve operation timing developed. These computations are then translated into valve opening and closing commands that are sent to the valve actuator module, 1302. Thus, the control adapts to the actual engine operation characteristics instead of solely relying on those performance characteristics retained in memory.

The control presented herein differs substantively from other adaptive control means. This control is unique by virtue of using ignition sensor data to determine when charge ignition has occurred and to then use that data to control variable valve actuation (in particular the timing of the exhaust valve opening in the cylinder then in an expansion portion of the cycle). Note: If this exhaust valve were opened sufficiently prior to the cylinder, then in the compression cycle, attaining adequate compression pressure to ignite the charge, continued engine operation would likely fail.

The engine starting cycle sequence is a control function. The pivot shaft angle (or piston position) is monitored, by sensor 11, and when near the full stroke of the engine the starter action is reversed. This action is repeated until the ignition sensor 22 signals the engine has started—at which time the start cycle is terminated.

Load control, using data from load sensor 1213, is provided by a load control module 1307, which is a separate control function. The output from load control is an engine set point command to the primary control. This type of load control is useful when loads are direct coupled to the engine shaft.

Figure 14A:
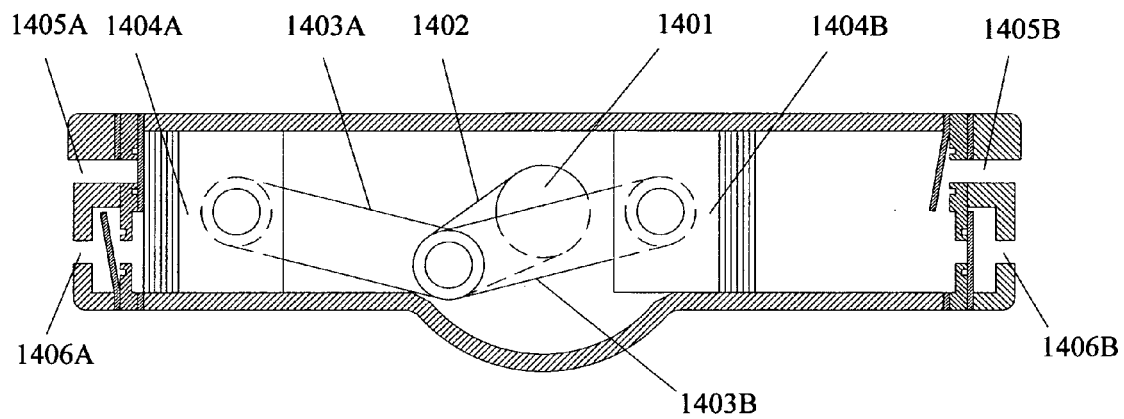
FIG. 14A is a cross section of a compressor utilizing a rocker arm and pivot shaft mechanism that would be suitable for direct drive by the pivot shaft of the preferred embodiments of the present invention engine in FIGS. 1-10, with the pistons shown at left full stroke.
Figure 14B:
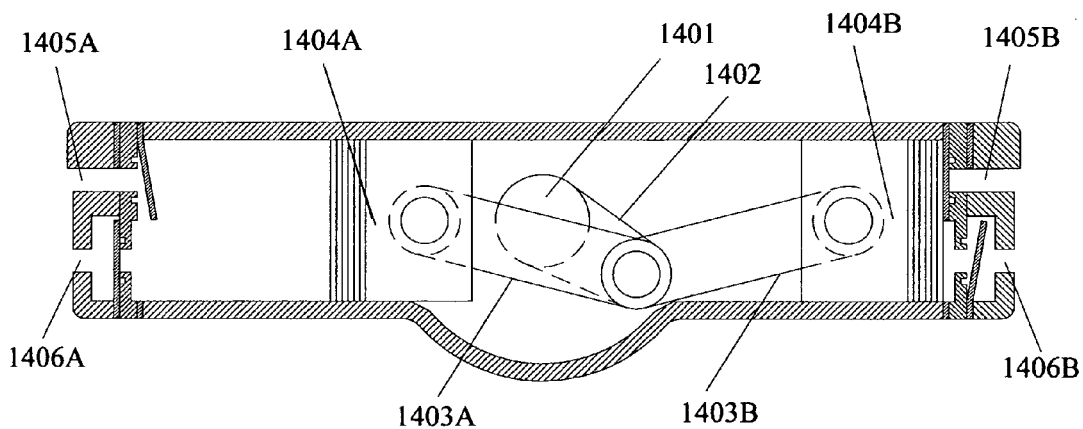
FIG. 14B is the same as FIG. 14A but with the pistons shown at right full stroke.

FIGS. 14A and 14B are cross sections, through the centerline, of a linear piston reciprocating compressor, which can directly utilize the oscillating motion of the rocker arm and pivot shaft design of FIG. 1 through FIG. 8, or rack and pinion design of FIG. 9 and the oscillating motion of the rocker arm and pivot shaft design of FIG. 16. The compressor of FIG. 14A consists of: pivot shaft 1401, connecting rods 1403A and 1403B which join pistons 1404A and 1404B to the rocker arm 1402. Reed style valves, 1405A and 1405B control the intake of pistons 1404A and 1404B respectively. Reed style valves 1406A and 1406B control the exhaust of pistons 1404A and 1404B respectively. FIG. 14A shows piston 1404A at full stroke and piston 1404B at minimum stroke. FIG. 14B shows the opposite. Given that the engine stroke and pivot shaft angle can vary, the compressor shaft angle, and consequently displacement, will vary in accordance with the engine variation. The compressor reed style valves will passively follow the piston pressure and suction cycle, regardless of stroke length. Such a compressor can be used for any gas, such as air or refrigerant. A similar design to the foregoing can be used on liquid pumps—with check valves replacing reed valves. Thus, for many types of potential applications of this engine design, it is not necessary to convert the oscillating motion of the engine shaft to a rotary motion. Furthermore, the compressor or pump of this design can be directly coupled to the engine pivot shaft. Also, compressor or pumps of this design can be a single cylinder or any number of multiple cylinders.

Figure 15A:
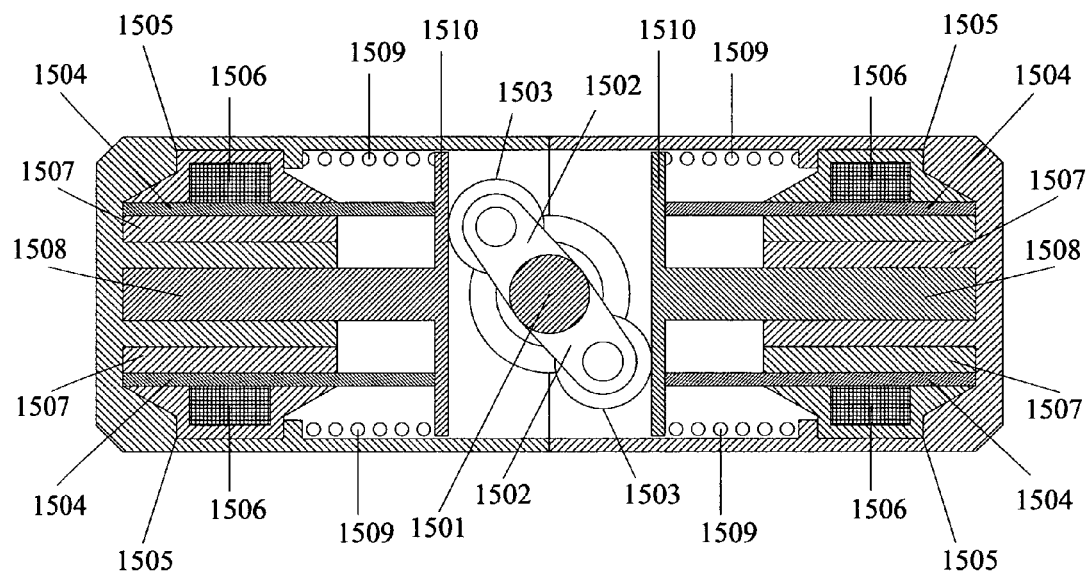
FIG. 15A is a cross section of a linear alternator suitable for direct drive by the pivot shaft of the preferred embodiments of the present invention engine shown in FIGS. 1-10, with the rocker arm positioned at an oblique angle relative to the driver heads.
Figure 15B:
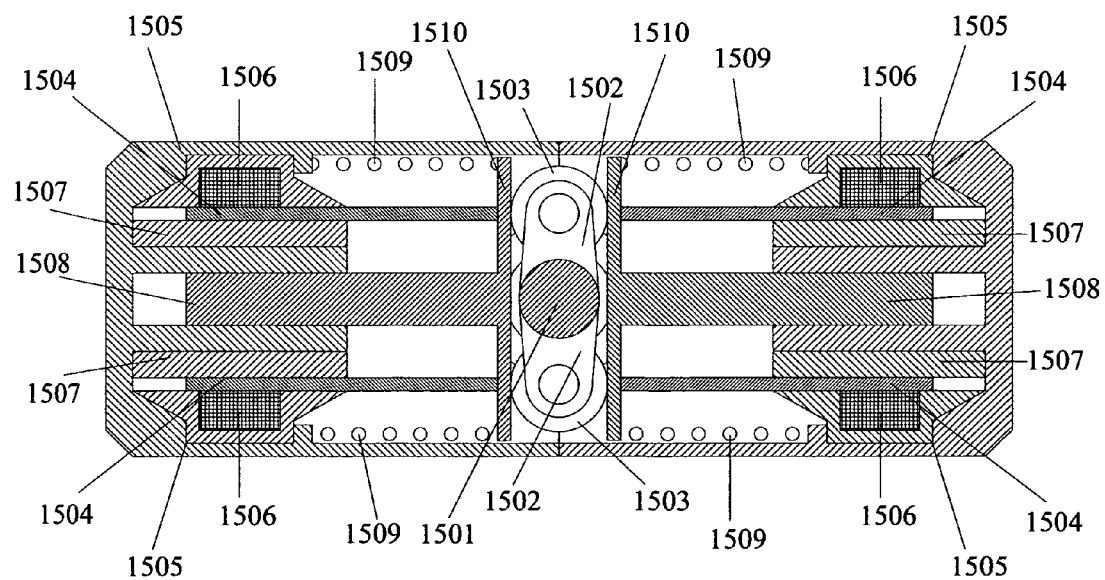
FIG. 15B is a cross section of a linear alternator suitable for direct drive by the pivot shaft of the preferred embodiments of the present invention engine in shown in FIGS. 1-10, with the rocker arm positioned substantially parallel to the driver heads.

FIG. 15A is a cross section of two linear alternators driven from a rocker arm and pivot shaft. The alternator armatures are shown at full stroke and the rocker arm at maximum pivot angle. In FIG. 15B the alternator armatures are shown at minimum stroke with the rocker arm at the mid pivot angle. With the pivot arm moving to full pivot angle, clockwise, the alternator armatures will move to full stroke again. Thus, for each cycle of the pivot arm, the alternator armatures complete two cycles. The pivot shaft 1501 has two sets of rocker arm 1502 attached 180 degrees from each other. Each rocker shaft has a bearing 1503 secured at the end. The bearing 1503 moves the driver head 1510 such as to compress the return spring 1509 and cause the magnet ring 1504 to oscillate between the inner lamination 1507 and the outer lamination 1505. The outer lamination 1505 contains winding 1506 forming a generator stator pole, which is excited by the changing magnetic field as the magnet ring 1504 moves past—producing an alternating voltage in the winding. Armature guide 1508 holds the armature in proper concentricity to the stator poles. The alternator geometry shown is of a type similar to commercially available linear alternators, generally applied to linear free piston Sterling engines. There are several other linear alternators commercially available that could also be utilized with the rocker arm and pivot shaft configuration. However, the frequency doubling aspect of the rocker arm and pivot shaft design presented herein is unique. By operating at a frequency twice that of the prime mover the alternator can be designed with smaller windings and laminations, thereby improving the specific power (kW/lb) of the unit and lowering the cost of the unit. Nonetheless, linear alternators in general, suffer from lower efficiency, lower specific power, and higher cost than comparable rotary alternators. This is particularly so when the current high-speed alternators found on commercially available micro-turbines are considered. These high-speed alternators typically utilize permanent magnet rotors, similar to the linear alternator, but for the same power output require a considerably smaller amount of permanent magnet material. The higher frequency operation also leads to smaller windings and laminations. These aspects allow smaller and more cost effective designs to be built, compared to linear alternators (or conventional rotary alternators). Thus, it would be advantageous to utilize a high-speed generator with the FPFS engine.

Figure 1B:
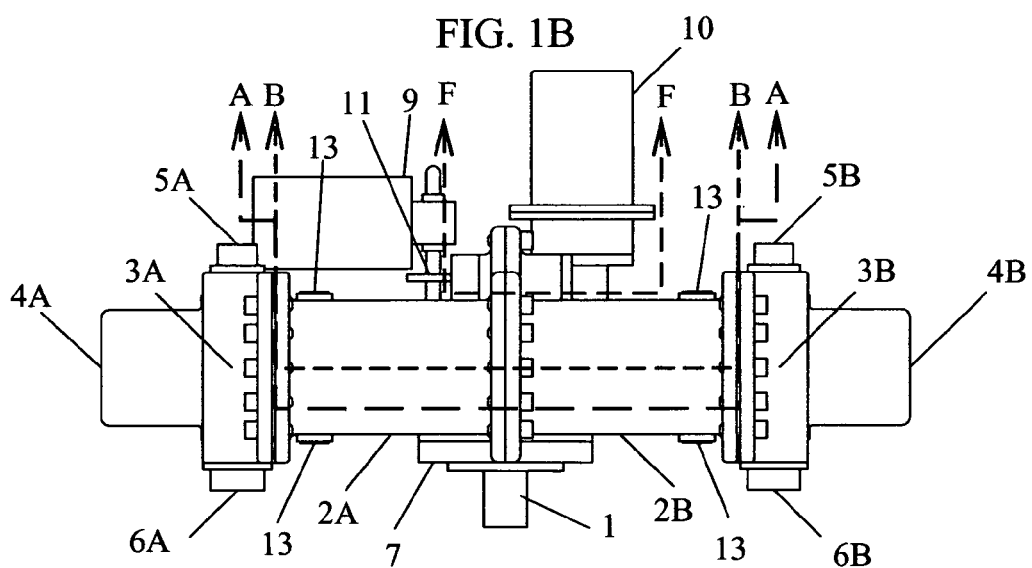
FIG. 1B is a top view of the most preferred embodiment of the present invention engine shown in FIG. 1A.
Figure 1C:
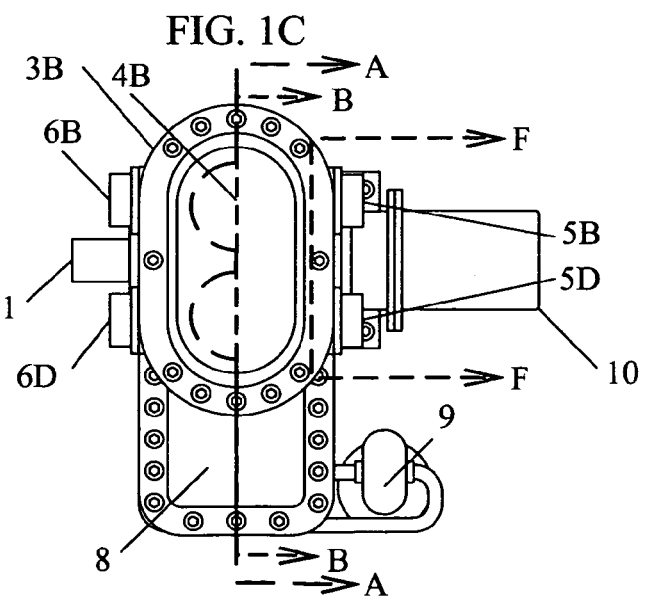
FIG. 1C is a right side view of the most preferred embodiment of the present invention engine shown in FIG. 1A.

FIG. 16-19 are outline drawings of a of a four cycle, four cylinder, premixed charge compression ignition, free piston, floating stroke, internal combustion engine, similar to that shown in FIG. 1 but with: 1) the cylinders set in a quad engine block, 2) the addition of a turbo-charger and 3) the addition of a power-turbine driving a high-speed alternator. In this configuration the free piston engine functions as a gas generator, or engine "core" 1601 for the turbines. Engine power is extracted from the power-turbine. The free piston engine pivot shaft is not used for power extraction. Its primary function is to support and connect the rocker arms and secondarily to facilitate starting the engine. With the turbocharger creating charge pressure ratios in the range of typically 2:1 to 5:1 specific power increases proportionate to air mass flow. This engine design is characterized by high efficiency, low emissions, high specific power, and a wide turn down range (which is attained by varying both the boost pressure and the air/fuel ratio). The cost of turbo-charging is less than the cost of increasing the free piston engine displacement—to achieve the same power rating. However, the power turbine cost is higher than power extraction from the pivot shaft. Combining both the turbo-charging or super-charging and power turbine features produces a cost effective engine of superior performance.

Figure 16A:
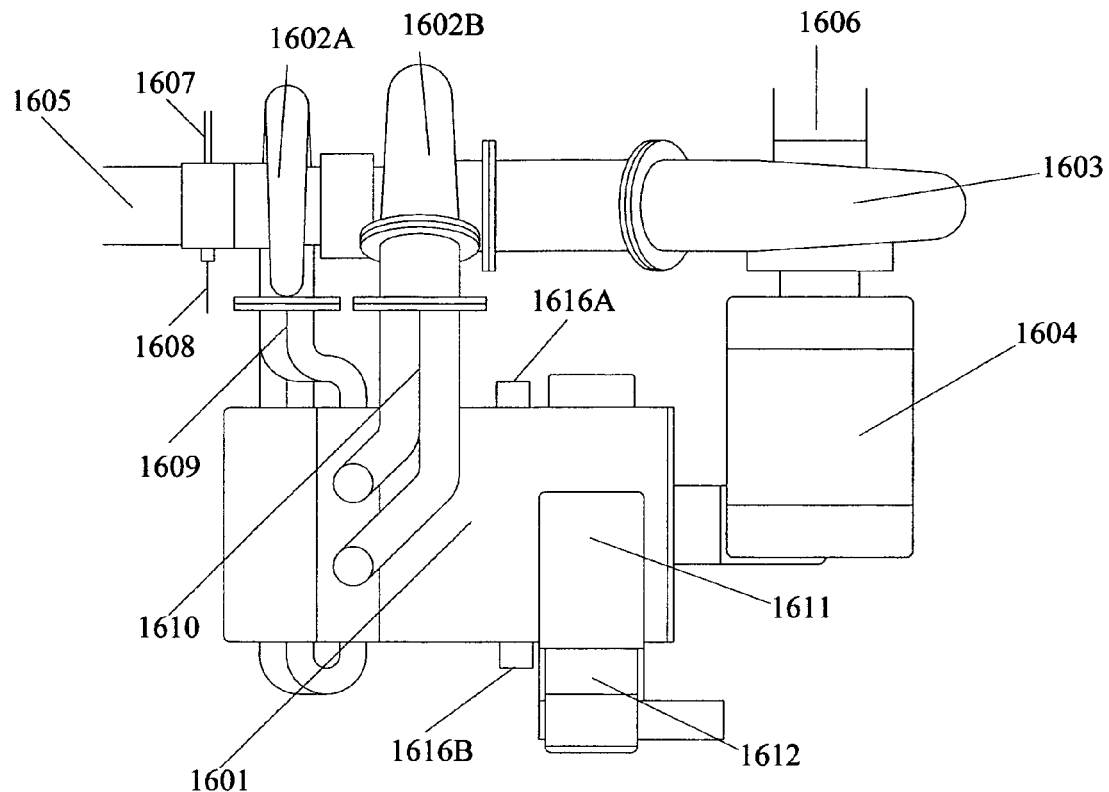
FIG. 16A is a top view of a ninth preferred embodiment of the present invention engine that contains a variant of the engine in FIG. 1 which does not extract power from the engine shaft but from a power turbine driven by the engine exhaust gas, and which has a turbocharger interposed between the engine and the power turbine so that in this arrangement the piston engine functions as a high-pressure gas generator, with the piston pairs set in a quad manner with a separate rocker arm for each piston pair.

FIG. 16A is a top view of the engine. In the free piston engine core 1601 charge intake begins at air intake 1605 then to fuel inlet 1607 and air flow sensor 1608 to the turbo-charger compressor 1602A then to intake manifold 1609. From engine core 1601 the exhaust goes to manifold 1610 then to turbine, 1602B then to the power-turbine 1603 and out exhaust pipe 1606. The power-turbine directly drives a high-speed generator 1604. Note: The power-turbine output can be mechanically couple to a load, directly or through a transmission—as is common on gas turbines. Engine starting is provided by means of a hydrostatic drive, consisting of hydraulic piston pump 1612 and electric drive motor 1611 providing hydraulic pressure and flow to hydraulic pistons 1613.

Figure 16B:
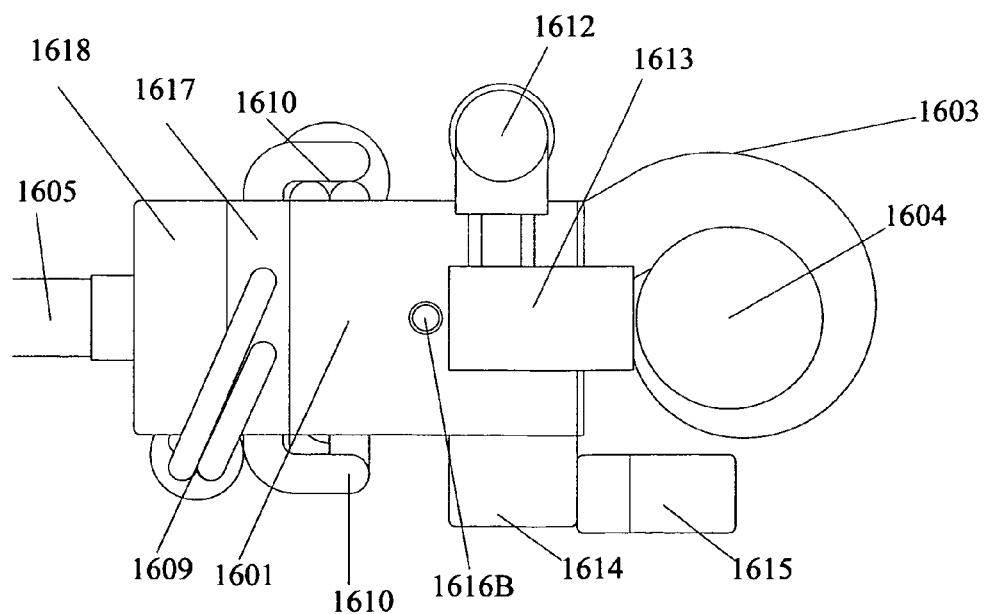
FIG. 16B is a side view of the ninth preferred embodiment shown in FIG. 16A.

FIG. 16B is a front view of the engine. Hydraulic piston 1613 connected to hydraulic piston pump 1612 drives the pivot shaft during engine starting. Electrically powered oil pump 1615 draws oil from oil pan/sump 1614 and pressurizes the oil lines within the engine to lubricate bearings, valves and pistons. Engine coolant flows in and out of ports 1616A and 1616B. The engine has a single cylinder head 1617 and valve cover 1618. Generator 1604 is of a design type currently used on micro-turbines and, depending on the engine size, would rotate in a range of speed from 25,000 to 150,000 revolutions per minute (smaller engines operate at the higher speed). The advantages of high-speed generators—versus a conventional generator coupled to the turbine by a speed reducer—include: 1) much higher specific power (kW/lb), 2) higher frequency alternating current—which can utilize smaller electrical circuit components (such as transformers) and 3) greater flexibility of engine operation. Often electrical output from this type of generator is sent to a solid-state power converter for improved matching to the electrical load. The cost and complexity of power converters substantially offsets the first two previously noted advantages but adds a substantial degree of electrical power flexibility. High-speed generators with permanent magnet rotors are commercially available. Switched reluctance generators, which offer lower cost than permanent magnet designs (but also have a somewhat lower efficiency), are becoming available. Additionally, high speed induction generators may also be used.

Figure 17A:
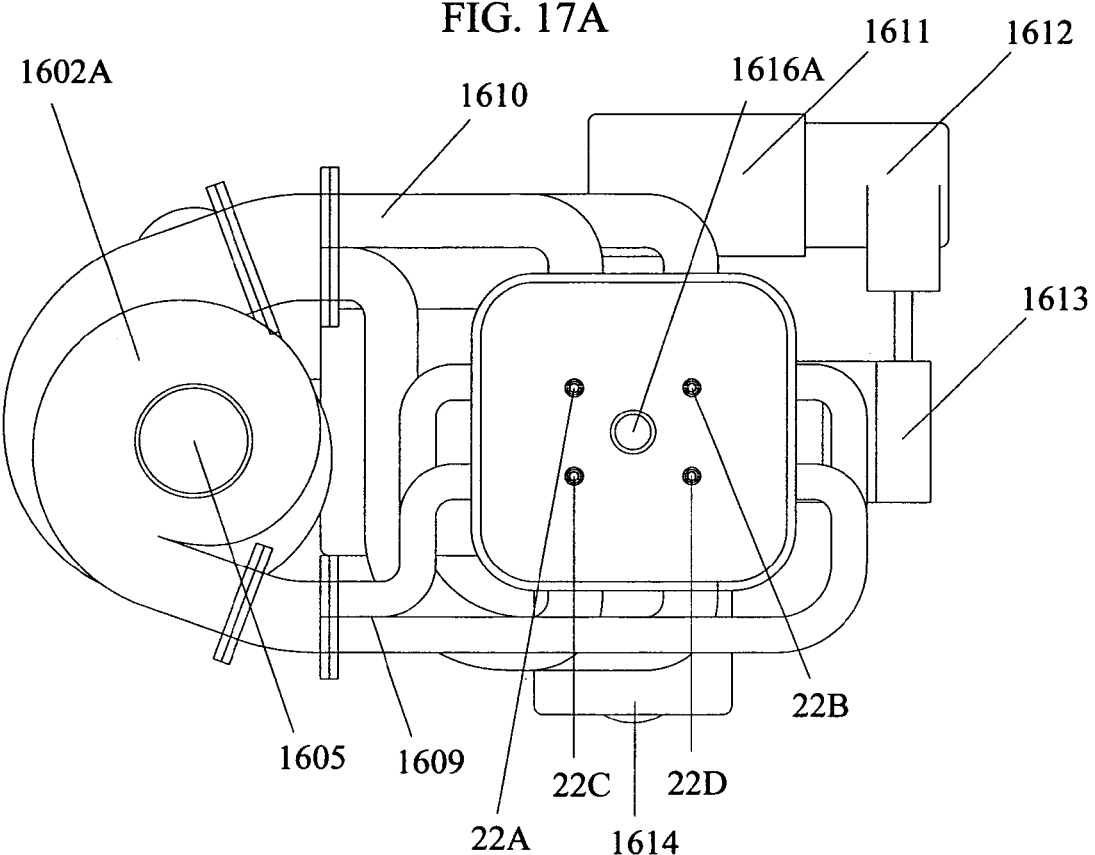
FIG. 17A is a left side view of the ninth preferred embodiment shown in FIG. 16A.
Figure 17B:
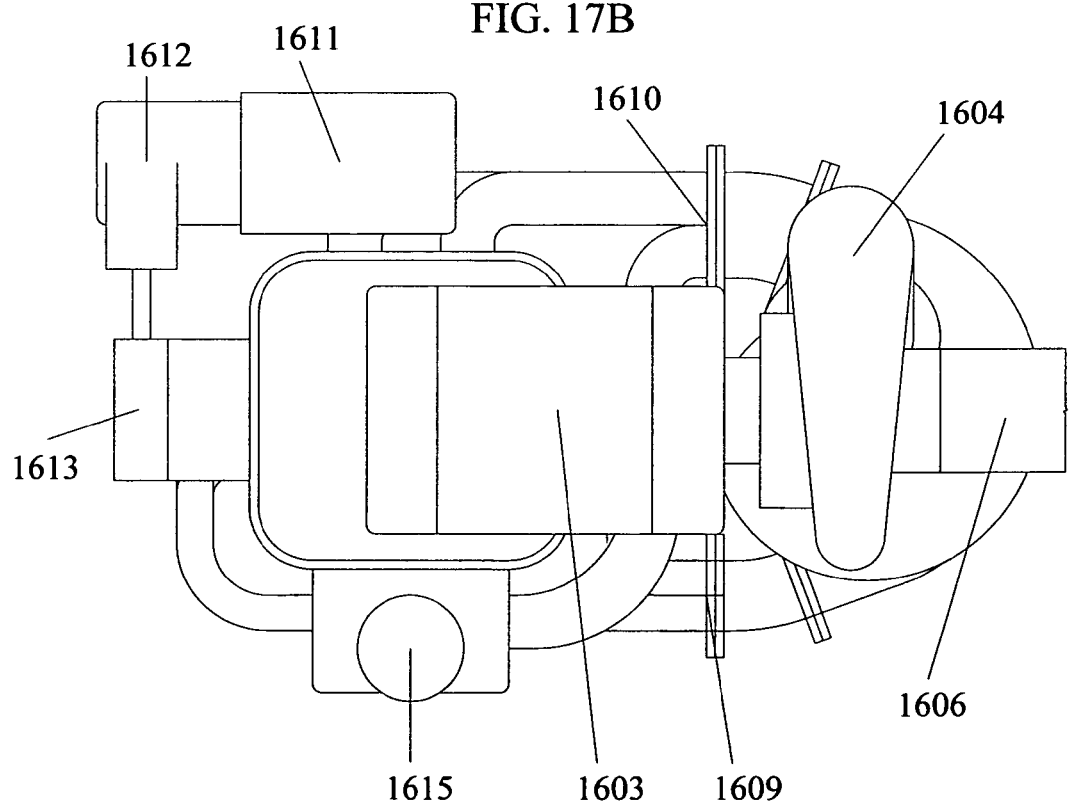
FIG. 17B is a right side view of the ninth preferred embodiment shown in FIG. 16A.

FIGS. 17A and 17B provide left side views and right side views of the engine of FIG. 16, respectively.

FIG. 18A is a left end view of the engine of FIG. 16A, with valve cover, 1618, removed. The placement of intake valve actuators 20A, B, C and D; exhaust valve actuators 21A, B, C and D and ignition sensors 22A, B C and D; illustrates the "quad" arrangement of the four cylinders.

FIG. 18B is cross section A-A of FIG. 18A taken through the centerline of the top cylinder pair, cylinder 1 and cylinder 2, of the free piston engine core 1601. In the quad configuration, cylinder 1 and cylinder 2 are adjacent to each other (as opposed to "in tandem" in the engine of FIG. 1.). Cylinder 3 and cylinder 4 are adjacent to each other and directly beneath and inline with cylinder 2 and 1 respectively. Component nomenclature from FIG. 1 is used in FIG. 18A and FIG. 18B, although the geometry will be somewhat different. There are four rocker arms, designated 26A, B, C and D. Rocker arms 26A and 26B make up a set and rocker arms 26C and 26D make up a second set. The connecting rods 25A, B, C and D are singly connected to each end of a rocker arm set. A pair of connecting rods with corresponding pistons is connected to each other at opposite ends of a set of rocker arms. The pistons are shown at full stroke.

Figure 19A:
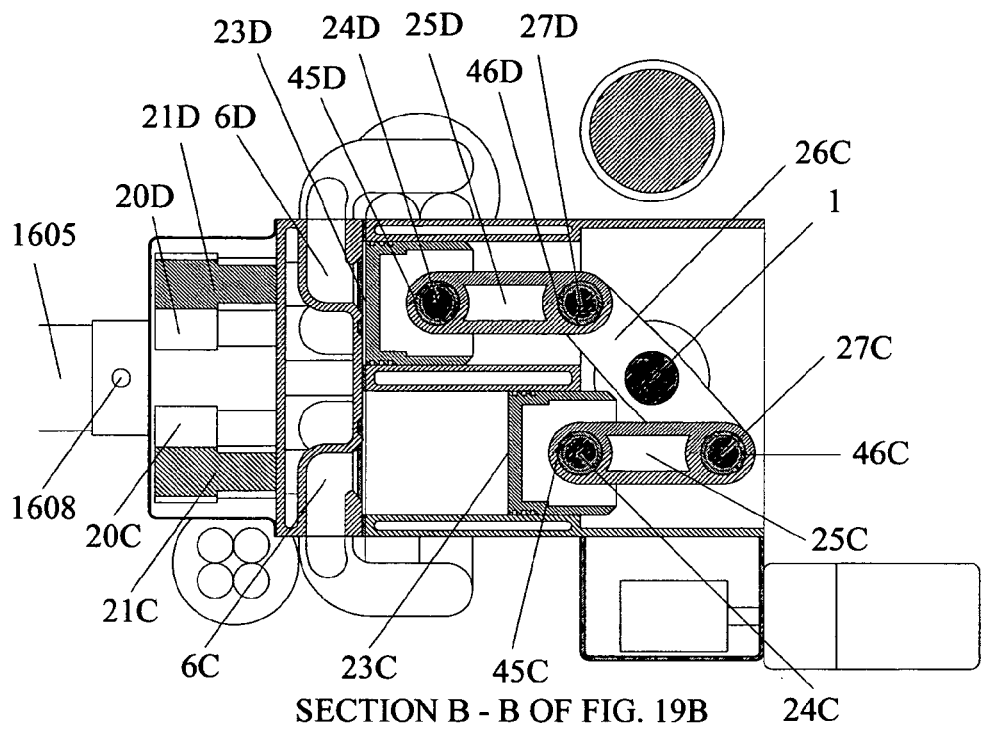
FIG. 19A is a side view of the ninth preferred embodiment, similar to FIG. 16B, but with a vertical cross-section taken through the centerline of the piston pair.
Figure 19B:
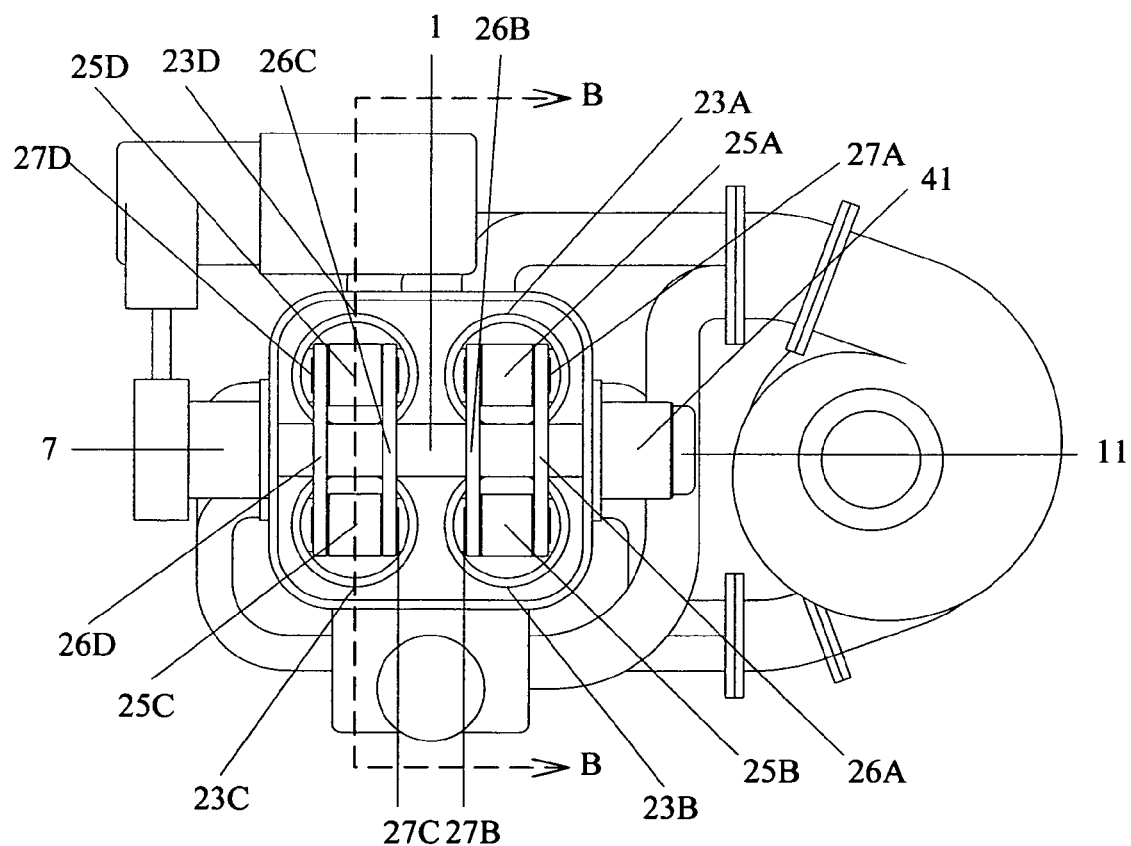
FIG. 19B is a right end view of the ninth preferred embodiment, similar to FIG. 17B, but with the crankcase cover removed.

FIG. 19A is cross section B-B of FIG. 19B through the centerline of cylinder 2 and cylinder 3. Pistons 23C and 23D are attached to rocker arms 26C and 26D by connecting rods 25C and 25D mounted on pins 24C and 24D at the piston end and pins 27C and 27D at the rocker arm end.

FIG. 19B is a right end view of the engine with the crankcase cover removed. The two sets of rocker arm pairs, consisting of 26A, B, C, and D, affixed to the pivot shaft, 1 and holding connecting rods 25A, B, C, and D with pins 27A, B, C and D are illustrated. Note that the two sets of rocker arm pairs could readily provide a means of utilizing a connecting rod design incorporating a split-bearing cap, as is common in conventional engine design. As is the case in the engine of FIG. 1, the rocker arms join two piston pairs with each other such that the motion of one piston pair is opposite that of the other piston pair. The length of rocker arms, from the pivot shaft, is made of sufficient length, such that the stroke of the pistons is not limited by the rocker arm geometry. In a similar manner to the engine of FIG. 1, in this configuration of the four cycle, four cylinder engine, each of the compression, expansion, exhaust and intake cycles are present at any given time, in one cylinder or the other. The expansion cycle of one cylinder drives the compression cycle of another. Thus, the length of piston travel is always constrained by the pressure of a compression cycle. The stroke length of the piston in the exhaust cycle is determined by the ignition event in the cylinder then in a compression stroke. The compression ignition is a function of a series of air/fuel parameters, which will vary to some extent from cycle to cycle. The stroke length of any given cycle is indeterminate until charge ignition occurs. Each piston compression stroke is independent of the other and the piston motion is completely free of mechanical stroke length limitations. This mechanism, as is the case of the engine illustrated in FIG. 1, also allows the stroke length to vary, or "float", according to the compression ratio required to ignite the charge on each compression cycle, fully independent of any other cylinders compression stroke. Unlike the engine configuration of FIG. 1, which extracts energy from the engine using the pivot shaft, 1, this engine extracts power using the power-turbine. Consequently, the exhaust gas from the engine exhaust port, 1601, is at a higher pressure, temperature and energy level than in the engine of FIG. 1. As a result, valve cooling and sealing is more demanding— but attainable with existing commercial designs. Exhaust manifold 1610 is also at a higher temperature and pressure, which can be accommodated by using heavier walled tubing and higher temperature rated metal alloys—which are also readily available. The single engine block, cylinder head and valve cover of this design enhance the rigidity of the engine. Furthermore, the manufacturability of the engine, due to single piece block and single piece cylinder head, is enhanced by ease of the assembly and sealing of this design—particularly if a connecting rod employing a split bearing cap design is used.

Figure 20:
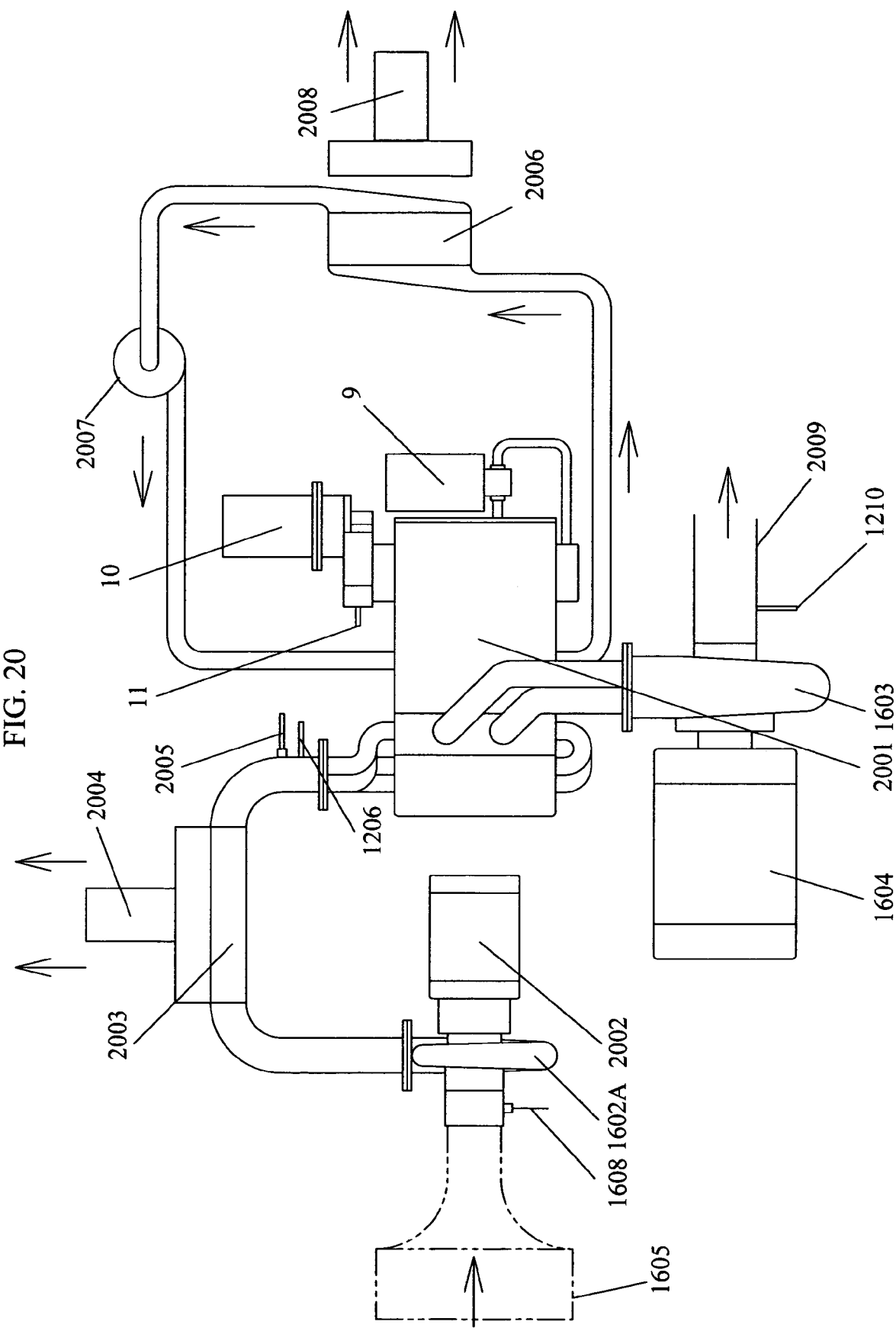
FIG. 20 is a top view of a tenth preferred embodiment of the present invention engine but with a supercharger instead of the turbocharger shown in FIGS. 16-19, and an intercooler is used in conjunction with the supercharger.

FIG. 20 and FIG. 21 are views of an engine similar to that of FIG. 16, but with a supercharger in lieu of a turbocharger and with the addition of an intercooler. An engine cooling loop is also illustrated.

FIG. 20 is a top view of the supercharged engine. Air induction to the engine is through air intake, 1605. Airflow is measured by sensor, 1608. Compressor, 1602, driven by motor, 2002, compresses the air and discharges it to the internal passages of an intercooler, 2003. The compressor motor, 2002, is under control of a variant of the adaptive engine control of FIG. 12 and FIG. 13. In this control version, in addition to all the elements shown in FIG. 12 and FIG. 13, the air flow of the compressor is varied, by changing the speed of the drive motor, 2002, to set the desired mass flow of the engine charge—and hence the engine power output. The intercooler is a heat exchanger that reduces the compressed air temperature, thereby increasing the density of the air (and in turn the density of the air/fuel charge). An air-to-air intercooler, 2003 with forced air over the external surface, provided by a motor driven fan, 2004, is shown, but other heat exchanger types (air-to-water, etc.) may be used. From the intercooler, 2003, the compressed and cooled air is discharged into the engine intake manifold of the free piston engine, 2001, which is functioning as a gas generator for the turbines. The intake manifold contains temperature sensor, 2005 and fuel nozzle (s), 1206. The adaptive engine control, FIG. 12 and FIG. 13, uses the temperature sensor, 2005, input to control the compressed air temperature by varying the speed of intercooler fan motor, 2004. The adaptive engine control in FIG. 12 and FIG. 13 determines the proper amount of fuel to inject into the compressed air to attain the desired air/fuel ratio. From the exhaust of the free piston engine gas generator, 2001, the hot pressurized gas flows into the exhaust manifold, 1610, then into the power-turbine, 1603. The power turbine, 1603, directly drives the high-speed generator, 1604. Note that in this instance the high-speed generator will be of sufficient to power the supercharger drive motor, 2002, as well as producing the engine output power. From the power-turbine the gas is exhausted into the exhaust pipe, 2009. The exhaust gas in the exhaust pipe flows past the exhaust sensor, 1210.

A free piston engine, 2001, coolant loop consisting of the heat exchanger (radiator), 2006, the radiator fan, 2008, and the coolant pump and motor, 2007 is shown, however, many variations are possible (e.g. coolant-to-water heat exchanger). The supercharged engine of FIG. 20 provides an improved means of controlling the engine power output and emissions levels while providing more rapid throttle response—than the turbocharged version presented in FIG. 16. However, the improved characteristics of the supercharged engine derive from the use of more costly components (high-speed electric drive motor and electric drive vs.

the gas turbine of the turbocharger and a higher capacity power-turbine and high-speed generator and electric power conditioning module). The trade off between superior performance and higher cost of the supercharged engine vs. that of the turbocharged engine makes the choice between the two configurations specific to the requirements of the various potential applications.

Figure 21A:
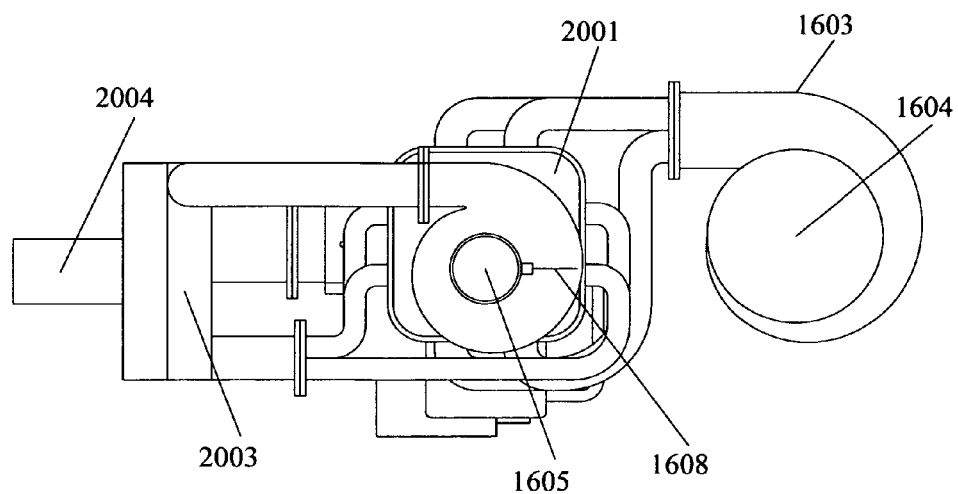
FIG. 21A is a left end view of the tenth preferred embodiment shown in FIG. 20.

FIG. 21A is left end view of the supercharged engine of FIG. 20.

Figure 21B:
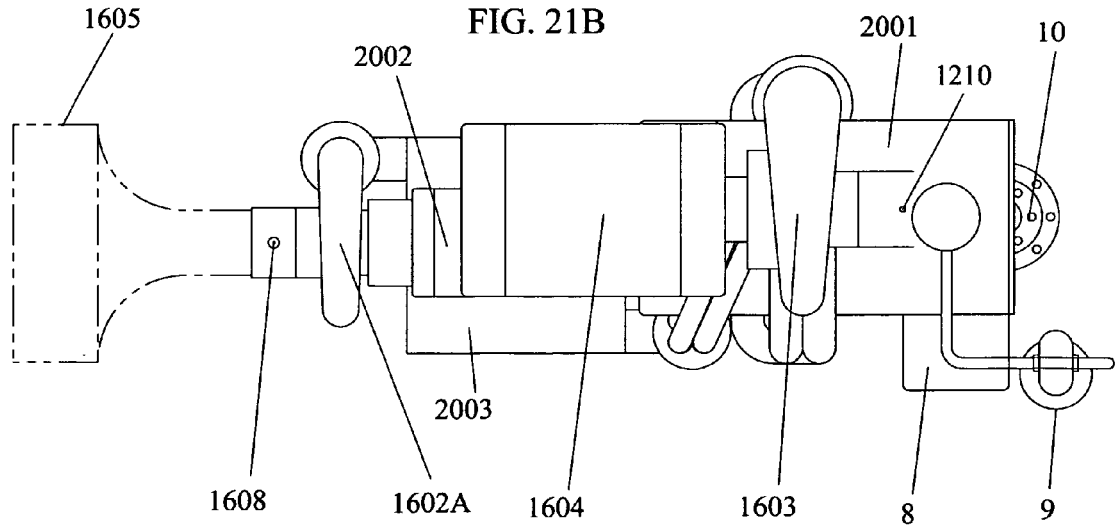
FIG. 21B is a side view of the tenth preferred embodiment shown in FIG. 20.

FIG. 21B is a side view of the supercharged engine of FIG. 20.

Figure 22:
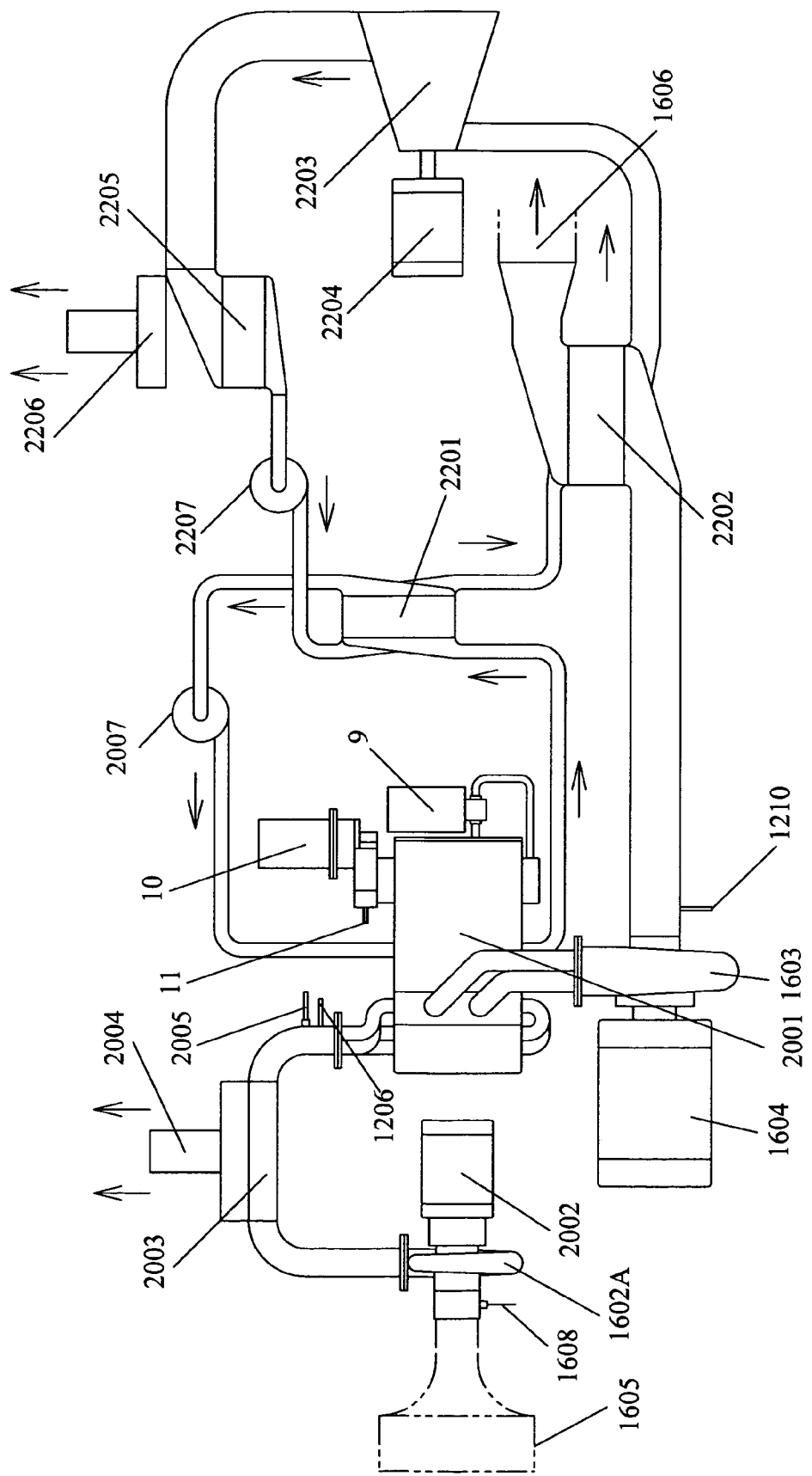
FIG. 22 is a schematic combined cycle version of the tenth preferred embodiment shown in FIG. 20, and an organic Rankine cycle used to recover energy from the engine cooling jacket and exhaust.

FIG. 22 is the supercharged engine of FIGS. 20 and 21 with the addition of a heat recovery system and a Rankine cycle turbine, which function together as a combined cycle system. The coolant radiator 2006 of FIG. 20 has been replaced by a heat exchanger 220 which recovers heat from the engine coolant and transfers it to the Rankine cycle fluid as an evaporator stage. From the coolant heat exchanger 2201 the Rankine cycle fluid moves to the exhaust heat exchanger 2202 which functions as a superheater. The high temperature high pressure Rankine fluid vapor then flows to an expander device 2203 which converts the energy in the Rankine cycle vapor into mechanical energy. In the arrangement shown the expander 2203 is direct coupled to a high-speed electrical generator 2204. From the expander 2203 the lower pressure, lower temperature Rankine fluid flows to the heat exchanger 2205 that functions as a Rankine cycle condenser. Fan 2206 circulates ambient air across heat exchanger 2205. From the condenser heat exchanger 2205 the feed pump 2207 boosts the Rankine cycle pressure and pumps the Rankine fluid to the input of the coolant heat exchanger 2201 thus completing the Rankine cycle circuit. Given the operating temperatures of the engine coolant and the engine exhaust gas an organic Rankine cycle would be expected to provide the greatest energy recovery efficiency. One family of organic fluid exhibiting good characteristics for the engine coolant and exhaust temperatures is the family of Siloxane fluids that could be used as a single fluid or in a binary combination.

In addition to the foregoing combined cycle configuration other variants of energy recovery systems, such a combined power and heat, can be used with the family of FPFS free piston, floating stroke engines presented herein.

What is claimed is:

1. A fourcycle, free piston, premixed charge, compression ignition, internal combustion reciprocating piston engine with a variable piston stroke comprising:

four cylinders constructed in a manner typical of reciprocating engines, each of said cylinders having two open ends;

at least one cylinder head affixed to said cylinders and configured to close one of said open ends of each said cylinder;

four pistons, each associated with and positioned for free movement within a different one of said cylinders;

two of said pistons coupled by a first mechanism to form a first piston pair so as to reciprocate together and the other two of said pistons coupled by a second mechanism to form a second piston pair so as to reciprocate together;

means of causing said first piston pair to reciprocate together, and said second piston pair to reciprocate together, all without a predetermined stroke length, and in a manner that allows a variable stroke and variable compression ratio, and wherein said reciprocation together of the said second piston pair is selected from a group consisting of reciprocation in the opposite direction to said first piston pair and reciprocation in the same direction as said first piston pair;

means of forming a premixed charge of fuel and reactant, said means of forming comprising means of controlling the size of said premixed charge and means of controlling the composition of said charge;

at least one intake valve associated with each of said cylinders which is configured to control the introduction of said premixed charge into the associated one of said cylinders;

means of conducting said premixed charge of fuel and reactant to each of said at least one intake valves;

said pistons each configured and dimensioned to create an intake stroke within an associated one of said cylinders wherein reciprocating motion of said piston away from said cylinder head allows said premixed charge to travel through said at least one intake valve and into the one of said cylinders associated therewith;

a combustion chamber formed within each of said cylinders, each said combustion chamber defined by said piston, the associated one of said cylinders, and said at least one cylinder head closing said cylinder;

said pistons each configured and dimensioned to also create a compression stroke within an associated one of said cylinders wherein reciprocating motion of said piston toward said at least one cylinder head continues until said piston compresses said premixed charge in said combustion chamber sufficiently to raise the temperature of said premixed charge to cause autoignition of said premixed charge and form combusted gases;

said pistons each configured and dimensioned to further create an expansion stroke within an associated one of said cylinders into which said piston is positioned for free movement wherein reciprocating motion of said pistons away from said at least one cylinder head allows said combusted gases in said combustion chamber to expand;

said at least one exhaust valve associated with each of said cylinders and configured to control the discharging of said combusted gases from said cylinder;

said pistons each configured and dimensioned to create an exhaust stroke within an associated one of said cylinders into which said piston is positioned for free movement wherein reciprocating motion of said piston toward said at least one cylinder head allows said expanded combustion gases to be exhausted through at least one said associated exhaust valve;

means of conducting said combustion gases as exhaust from said engine;

means for controlling the timing and causing of said intake valves and said exhaust valves to open and close during all of said cycles;

means of providing lubrication of said engine;

closure means adapted for sufficiently closing so as to contain lubricants and gas leakage past said pistons the one of said open ends of each said cylinder not closed by said at least one cylinder head;

means for starting said engine; and means of providing cooling of said engine.

2. The engine as set forth in claim 1 further comprising linearly oscillating means adapted for being driven by said reciprocating motion of said pistons and extracting power from said engine.

3. The engine as set forth in claim 1 further comprising a pivot shaft connected to said reciprocating pistons and means adapted for being driven by said pivot shaft and extracting power from said engine.

4. The engine as set forth in claim 1 wherein at least one of said engines functions as a gas generator, and further comprising turbine means driven by said exhaust from said gas generator and adapted for extracting power from said gas generator.

5. The engine as set forth in claim 4 further comprising electrical generator means connected to said turbine means and adapted for extracting power from said turbine means.

6. The engine as set forth in claim 5 wherein said turbine means comprises directly connected high-speed turbines and said electrical generator means comprises directly connected high-speed generators.

7. The engine as set forth in claim 1 further comprising an electronic engine control having connections for said means for controlling the timing and causing of said intake valves and said exhaust valves to open and close during all of said cycles that are selected from a group consisting of electrical connections and electronic connections, said electronic engine control also having features selected from a group consisting of: an adaptive electronic control modules provided with the input of sensors and data, and which further comprises computational capability; an adaptive electronic control modules provided with the input of sensors and data, and which further comprises computational capability in the form of a microprocessor capable of determining the actual compression ratio that auto-ignited said premixed charge and using said computation in comparison to said input data to adjust and modify the timing and duration of opening and closing of said intake and said exhaust valves; an adaptive electronic control modules provided with the input of sensors and data, and which further comprises computational capability in the form of a microprocessor capable of determining the actual compression ratio that auto-ignited said premixed charge and using said computation in comparison to said input data to control fuel and reactant properties in said premixed charge; an adaptive electronic control module provided with input sensors and data input means, said adaptive control module further comprising computational capability in the form of a microprocessor capable of determining the actual compression ratio that auto-ignited said premixed charge and using said computation in comparison to input data provided by said data input means, said adaptive electronic control module also comprising output control means adapted for providing electrical and/or electronic output that maintains optimum engine operating conditions, said input sensors of said adaptive electronic control module having electrical and/or electronic connection to sensor input terminals of said electronic engine control, said input sensors also selected from a group consisting of: fuel flow sensors; fuel flow sensors providing fuel mass flow data; fuel and reactant characteristics sensors; fuel and reactant characteristics sensors providing reactant mass flow data; fuel and reactant charge temperature sensors; engine temperature sensors; engine throttle sensors; engine throttle sensors providing an engine operating set point in digital format; engine start and stop signal sensors; engine load sensors; position sensors sensing the position of said pistons; engine exhaust emission sensors; ignition sensors in each of said cylinders having features further selected from a group consisting of: piezoelectric pressure transducers, ion sensors, fast thermocouples and fast UV flame sensors, said data input means of said adaptive electronic control module having electrical and/or electronic connection to said electronic engine control, said data input means selected from a group consisting of: electronic data input and data storage capability, electronic data input and data storage capability including data on the anticipated compression ratio required to reach auto-ignition of the charge of fuel and reactant under varying ambient conditions, electronic data input and data storage capability including data on the anticipated compression ratio required to reach auto-ignition of the charge of fuel and reactant over the engine operating range, electronic data input and data storage capability including data on engine operating condition limitations, electronic data input and data storage capability including data on engine operating condition limitations in the form of a high speed data look up table, said output control means of said adaptive electronic control module having electrical and/or electronic connection to said electronic engine control said output control means selected from a group consisting of: intake and exhaust valve actuation devices, charge and reactant mixing and control devices, exhaust gas recirculation devices, engine coolant devices and engine lubrication devices.

8. The engine as set forth in claim 1 further comprising variable valve actuation adapted for individually actuating said at least one intake valve and said at least one exhaust valve associated with each of said cylinders, said variable valve actuation comprising:
   at least one poppet intake valve, a return spring, seal and valve guide located within each said cylinder head intake port all constructed in a manner typical of reciprocating engines such that actuating said at least one poppet intake valve will effect gas exchange between said port and said cylinder;
   at least one poppet exhaust valves, a return spring, seal and valve guide located within each said cylinder head exhaust port all constructed in a manner typical of reciprocating engines such that actuating said at least one poppet exhaust valve will effect gas exchange between said port and said cylinder;
   at least one camshaft located above each said cylinder head and having cam lobes for each said poppet valve in said cylinder affixed thereto in such a manner to effect actuation thereof;
   said cylinder poppet intake and exhaust valves each having a valve stem end typical of reciprocating engines that is located above said cylinder head;
   means adapted for mounting said at least one camshaft over said cylinder intake and exhaust valves such that said camshaft lobes actuate respective ones of said poppet intake and exhaust valves by imparting pressure and linear movement of said valve stem ends as mounted ones of said camshafts are rotated or indexed to cause said poppet intake and exhaust valves to open and close;
   means adapted for motorized rotation or indexing of said at least one camshaft that is selected from a group consisting of: electric drive motors; bi-directional stepper motors and bi-directional torque motors;
   means adapted for electronic control of said motorized rotation or indexing means;
   lubrication means for said at least one camshaft; and
   lubrication means for said poppet valves.

* * * * *